United States Patent [19]

Vail, III et al.

[11] Patent Number: 6,031,381
[45] Date of Patent: Feb. 29, 2000

[54] ELECTRICAL VOLTAGES AND RESISTANCES MEASURED TO INSPECT METALLIC CASED WELLS AND PIPELINES

[75] Inventors: William Banning Vail, III, Bothell; Steven Thomas Momii, Seattle, both of Wash.

[73] Assignee: ParaMagnetic Logging, Inc., Woodinville, Wash.

[*] Notice: This patent is subject to a terminal disclaimer.

[21] Appl. No.: 08/685,796

[22] Filed: Jul. 23, 1996

Related U.S. Application Data

[63] Continuation of application No. 08/271,869, Jul. 7, 1994, abandoned, which is a continuation-in-part of application No. 08/083,615, Jun. 28, 1993, Pat. No. 5,570,024, which is a continuation-in-part of application No. 07/754,965, Sep. 4, 1991, Pat. No. 5,223,794, which is a division of application No. 07/434,886, Nov. 13, 1989, Pat. No. 5,075,626, which is a continuation-in-part of application No. 07/089,697, Aug. 26, 1987, Pat. No. 4,882,542, which is a continuation-in-part of application No. 06/927,115, Nov. 4, 1986, Pat. No. 4,820,989.

[51] Int. Cl.$^7$ ................................................. G01B 27/08
[52] U.S. Cl. ........................................... 324/716; 324/718
[58] Field of Search ..................................... 324/357, 358, 324/366, 368, 700, 715, 716, 718, 219, 220, 221

[56] References Cited

U.S. PATENT DOCUMENTS

| | | | |
|---|---|---|---|
| 2,891,215 | 6/1959 | Fearon | 324/368 |
| 3,405,356 | 10/1968 | Hubby | 324/715 |
| 4,431,963 | 2/1984 | Walkow | 324/715 X |
| 4,431,964 | 2/1984 | Walkow | 324/715 X |
| 4,796,186 | 1/1989 | Kaufman | 324/368 X |
| 4,820,989 | 4/1989 | Vail, III | 324/368 |
| 4,857,831 | 8/1989 | Davies et al. | 324/715 X |
| 4,902,981 | 2/1990 | Gard et al. | 324/715 X |
| 4,947,132 | 8/1990 | Charoy et al. | 324/700 X |
| 5,043,668 | 8/1991 | Vail, III | 324/368 |
| 5,075,626 | 12/1991 | Vail, III | 324/368 |
| 5,223,794 | 6/1993 | Vail, III | 324/368 |

FOREIGN PATENT DOCUMENTS

| | | | |
|---|---|---|---|
| 0757991 | 8/1980 | U.S.S.R. | 324/221 |

*Primary Examiner*—Walter E. Snow

[57] ABSTRACT

A cased well in the earth is electrically energized with A.C. current. Voltages are measured from three voltage measurement electrodes in electrical contact with the interior of the casing while the casing is electrically energized. In a measurement mode, A.C. current is conducted from a first current carrying electrode within the cased well to a remote second current carrying electrode located on the surface of the earth. In a calibration mode, current is passed from the first current carrying electrode to a third current carrying electrode located vertically at a different position within the cased well, where the three voltage measurement electrodes are located vertically in between the first and third current carrying electrodes. Voltages along the casing and resistances along the casing are measured to determine wall thickness and the location of any casing collars present so as to electrically inspect the casing. Similar methods are employed to energize a pipeline to measure the wall thickness of the pipeline and the location of pipe joints to electrically inspect the pipeline.

9 Claims, 21 Drawing Sheets

ELECTRICAL VOLTAGES AND RESISTANCES MEASURED TO INSPECT METALLIC CASED WELLS AND PIPELINES

This application is a continuation application under 37 CFR § 1.62 of Ser. No. 08/271,869 having a filing date of Jul. 7, 1994 having the title "Electrical Voltages and Resistances Measured to Inspect Metallic Cased Wells and Pipelines" (as amended on Oct. 16, 1995) that is abandoned.

U.S. Ser. No. 08/083,615 is a Continuation-in-Part Application of an earlier Divisional Application that is entitled "Methods of Operation of Apparatus Measuring Formation Resistivity From Within A Cased Well Having One Measurement and Two Compensation Steps"; which is U.S. Ser. No. 07/754,965; which has a filing date of Sep. 4, 1991; and that issued on Jun. 29, 1993 as U.S. Pat. No. 5,223,794 {"Vail(794)"}. A copy of U.S. Ser. No. 07/754,965 is included herein by reference.

U.S. Ser. No. 07/754,965 is a Divisional Application of an earlier Continuation-in-Part Application that is entitled "Electronic Measurement Apparatus Movable In A Cased Borehole and Compensating for Casing Resistance Differences"; which is U.S. Ser. No. 07/434,886; which has a filing date of Nov. 13, 1989; and which issued on Dec. 24, 1991 as U.S. Pat. No. 5,075,626 {"Vail(626)"}. U.S. Ser. No. 07/434,886 is included herein by reference.

U.S. Ser. No. 07/434,886 is a Continuation-in-Part Application of an earlier Continuation-in-Part Application having the title of "Methods and Apparatus for Measurement of Electronic Properties of Geological Formations Through Borehole Casing"; which is U.S. Ser. No. 07/089,697; which has the Filing Date of Aug. 26, 1987; and which issued on Nov. 21, 1989 as U.S. Pat. No. 4,882,542 {"Vail(542)"}. A copy of U.S. Ser. No. 07/089,697 is included herein by reference.

U.S. Ser. No. 07/089,697 is a Continuation-in-Part Application of the original Parent Application having the title "Methods and Apparatus for Measurement of the Resistivity of Geological Formations from Within Cased Boreholes"; which is U.S. Ser. No. 06/927,115; which has the Filing Date of Nov. 4, 1986; and which issued on Apr. 11, 1989 as U.S. Pat. No. 4,820,989 {"Vail(989)"}. A copy of U.S. Ser. No. 06/927,115 is included herein by reference.

This invention was made with Government support under DOE Grant No. DE-FG06-84ER13294, entitled "Validating the Paramagnetic Logging Effect", Office of Basic Energy Sciences, of the U.S. Department of Energy. The government has certain rights in this invention. The basic concept for the invention described herein was conceived during the funding provided by the above grant.

Ongoing research to measure resistivity through casing has been provided on a co-funded basis from: (a) U.S. Department of Energy Grant No. DE-FG19-88BC14243 entitled "Proof of Feasibility of Thru Casing Resistivity Technology"; (b) U.S. Department of Energy (DOE) Grant No. DE-FG22-90BC14617 entitled "Proof of Concept of Moving Thru Casing Resistivity Apparatus"; (c) U.S. Department of Energy (DOE) Grant No. DE-FG22-93BC14966 entitled "Fabrication and Downhole Testing of Moving Through Casing Resistivity Apparatus"; and (d) Gas Research Institute (GRI) Contract No. 5088-212-1664 entitled "Proof of Feasibility of the Through Casing Resistivity Technology". The government and the GRI have certain rights in this invention. The application herein was filed during periods of time funded by (c) and (d) above.

This invention provides new apparatus and methods of measurement for inspecting casing within cased wells. The invention provides new apparatus and methods of measurement for locating collars within cased wells. The invention may be used in any cased well, but will find wide application in oil and gas wells in particular that typically possess steel cased boreholes.

The invention provides new apparatus and methods of measurement for inspecting pipelines. The invention may also be used to inspect the walls of oil and gas pipelines. The invention is also useful to locate joints were the oil and gas pipelines are joined.

None of the data herein had been made public before the date of Jul. 8, 1993 wherein one of the inventors herein, William Banning Vail III, gave a verbal presentation entitled "Through Casing Resistivity" to The 1993 Formation Evaluation Technical Advisory Group sponsored by the Gas Research Institute in Chicago, Ill. William Banning Vail III publicly described at that meeting data that was used to unambiguously locate collars for the first time in PML's Test Well located in Woodinville, Wash.

This invention was conceived as a result of work on another invention, namely inventions conceived to measure the resistivity of geological formations from within cased wells. The oil industry has long sought to measure resistivity through casing. Such resistivity measurements, and measurements of other electrochemical phenomena, are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Many U.S. patents have issued in the pertinent Subclass 368 of Class 324 of the United States Patent and Trademark Office which address this subject. The following presents a brief description of the particularly relevant prior art presented in the order of descending relative importance.

U.S. patents which have already issued to the inventor in this field are listed as follows: U.S. Pat. No. 4,820,989 (U.S. Ser. No. 06/927,115); U.S. Pat. No. 4,882,542 (U.S. Ser. No. 07/089,697); U.S. Pat. No. 5,043,688 (U.S. Ser. No. 07/435,273); U.S. Pat. No. 5,043,669 (U.S. Ser. No. 07/438,268); U.S. Pat. No. 5,075,626 (U.S. Ser. No. 07/434,886); U.S. Pat. No. 5,187,440 (U.S. Ser. No. 07/749,136); and U.S. Pat. No. 5,223,794 (U.S. Ser. No. 07/754,96). These seven U.S. Patents are collectively identified as "the Vail Patents" herein.

The apparatus and methods of operation herein disclosed are embodiments of the Through Casing Resistivity Tool® that is abbreviated TCRT®. The Through Casing Resistivity Tool® and TCRT® are Trademarks of ParaMagnetic Logging, Inc. in the United States Patent and Trademark Office. ParaMagnetic Logging, Inc. has its principal place of business located at 18730—142nd Avenue N.E., Woodinville, Wash., 98072, USA, having the following telephone number: (206) 481-5474.

The Through Casing Resistivity Tool gives casing inspection information and collar location information as a natural byproduct of its operation. However, that information is useful in its own right and is of commercial value in its own right. Therefore, the invention herein includes any embodiment of the Through Casing Resistivity Tool or any portion thereof that is used for the purpose of inspecting casing and/or to determine the location of casing collars. The invention herein includes any embodiment of the Through Casing Resistivity Tool or any portion thereof that is used for the purpose of inspecting pipelines and/or to determine the location where such pipelines are jointed together.

An important paper concerning the Through Casing Resistivity Tool was published recently. Please refer to the article entitled "Formation Resistivity Measurements Through Metal Casing", having authors of W.B. Vail, S.T. Momii of ParaMagnetic Logging, Inc., R. Woodhouse of Petroleum and Earth Science Consulting, M. Alberty and R.C.A. Peveraro of BP Exploration, and J.D. Klein of ARCO Exploration and Production Technology which appeared as Paper "F", Volume I, in the *Transactions of the SPWLA Thirty-Fourth Annual Logging Symposium*, Calgary, Alberta, Canada, Jun. 13–16, 1993, sponsored by The Society of Professional Well Log Analysts, Inc. of Houston, Tex. and the Canadian Well Logging Society of Calgary, Alberta, Canada (13 pages of text and 8 additional figures). Experimental results are presented therein which confirm that the apparatus and methods disclosed in U.S. Ser. No. 07/434,886 that is U.S. Pat. No. 5,075,626 actually work in practice to measure the resistivity of geological formations adjacent to cased wells. To the author's knowledge, the SPWLA paper presents the first accurate measurements of resistivity obtained from within cased wells using any previous experimental apparatus. Page 6 of that paper describes attempts to locate casing collars from the data presented. One collar was clearly located, and another one was missed. Therefore, the data presented in that paper did not present compelling evidence that the TCRT could routinely locate all the casing collars present nor did it provide a methodology to routinely do so in practice. Page 6 of that paper however shows that different weight casings could be identified with the TCRT.

A verbal presentation entitled "Introduction to the Through Casing Resistivity Tool" was made to the Permian Basin Well Logging Society on Mar. 18, 1993.

A theoretical paper of considerable importance was published recently concerning resistivity measurements from within cased wells. It is entitled "Through-Casing Resistivity (TCR): Physics, Resolution, and 3-D Effects" having the authors of L. A. Tabarovsky, M. E. Cram, T. V. Tamarchenko, K. M. Strack and B. S. Zinger, of Atlas Wireline Services presented as Paper "TT", Volume II, in the *Transactions of the SPWLA Thirty-Fifth Annual Logging Symposium*, Tulsa, Okla., Jun. 19–22, 1994 (hereinafter, Tabarovsky, et. al., 1994).

Other papers have been published relevant to measurements of formation resistivity from within cased wells including the following: (a) a paper entitled "The Electrical Field in a Borehole With a Casing" by A. A. Kaufman, *Geophysics*, Vol. 55, No. 1, Jan. 1990, p. 29–38; and (b) a paper entitled "A Transmission-Line Model for Electrical Logging Through Casings", *Geophysics*, Vol. 58, No. 12, December, 1993, p. 1739–1747; (c) a technical report entitled "Final Report to ParaMagnetic Logging, Inc. for Numerical Analysis of D.C. Logging Through Metal Casing", having the authors of H. F. Morrison and C. J. Schenkel, Engineering Geoscience, College of Engineering, University of California, Berkeley, Calif., Nov. 22, 1991; and (d) a dissertation entitled "The Electrical Resistivity Method in Cased Boreholes", Dissertation for Doctor of Philosophy in Engineering: Materials Science and Mineral Engineering in the Graduate Division of the University of California at Berkeley, Berkeley, Calif., May 20, 1991.

Other recent articles appearing in various publications concerning the Through Casing Resistivity Tool and/or the Vail Patents include the following: (a) an article entitled "Electrical Logging: State-of-the-Art" by Robert Maute of the Mobil Research and Development Corporation, in *The Log Analyst*, Vol. 33, No. 3, May-June 1992 page 212–213; and (b) in an article entitled "Through Casing Resistivity Tool Set for Permian Use" in *Improved Recovery Week*, Volume 1, No. 32, Sept. 28, 1992.

The Vail Patents describe the various embodiments of the Through Casing Resistivity Tool ("TCRT"). Many of these Vail Patents describe embodiments of apparatus having three or more spaced apart voltage measurement electrodes which engage the interior of the casing, and which also have calibration means to calibrate for thickness variations of the casing and for errors in the placements of the voltage measurement electrodes. The TCRT may be used for casing inspection procedures and to locate casing collars.

U.S. Pat. No. 4,796,186 which issued on Jan. 3, 1989 to Alexander A. Kaufman entitled "Conductivity Determination in a Formation Having a Cased Well" also describes an apparatus having three or more spaced apart voltage measurement electrodes which engage the interior of the casing and which also have calibration means to calibrate for thickness variations in the casing and for errors in the placements of the electrodes. This patent has been assigned to, and is owned by, ParaMagnetic Logging, Inc. of Woodinville, Wash. In general, different methods of operation and analysis are described in the Kaufman Patent compared to the Vail Patents cited above.

U.S. Pat. No. 4,837,518 which issued on Jun. 6, 1989 to Michael F. Gard, John E. E. Kingman, and James D. Klein, assigned to the Atlantic Richfield Company, entitled "Method and Apparatus for Measuring the Electrical Resistivity of Geologic Formations Through Metal Drill Pipe or Casing", predominantly describes two voltage measurement electrodes and several other current introducing electrodes disposed vertically within a cased well which electrically engage the wall of the casing, henceforth referenced as "Gard (518)". However, that patent does not describe an apparatus having three spaced apart voltage measurement electrodes and associated electronics which takes the voltage differential between two pairs of the three spaced apart voltage measurement electrodes to directly measure electronic properties adjacent to formations. Nor does Gard (518) describe an apparatus having at least three spaced apart voltage measurement electrodes wherein the voltage drops across adjacent pairs of the spaced apart voltage measurement electrodes are simultaneously measured to directly measure electronic properties adjacent to formations. Therefore, Gard (518) does not describe the methods and apparatus disclosed in the Vail Patents.

USSR Patent No. 56,026, which issued on Nov. 30, 1939 to L. M. Alpin, henceforth called "Alpin (026)", which is entitled "Process of the Electrical Measurement of Well Casings", describes an apparatus which has three spaced apart voltage measurement electrodes which positively engage the interior of the casing. However, the Alpin (026) does not have suitable calibration means to calibrate for thickness variations of the casing nor for errors related to the placements of the voltage measurement electrodes. Therefore, Alpin (026) does not describe the methods and apparatus disclosed in the Vail Patents.

French Patent No. 2,207,278 having a "Date of Deposit" of Nov. 20, 1972 describes apparatus having four spaced apart voltage measurement electrodes which engage the interior of borehole casing respectively defined as electrodes M, N, K, and L. Various uphole and downhole current introducing electrodes are described. Apparatus and methods of operation are provided that determines the average resistance between electrodes M and L. French Patent No. 2,207,278 further explicitly assumes an exponential current flow along the casing. Voltage measurements across pair MN and KL are then used to infer certain geological parameters from the assumed exponential current flow along the casing. However, French Patent No. 2,207,278 does not teach measuring a first casing resistance between electrodes MN, does not teach measuring a second casing resistance between electrodes NK, and does not teach measuring a third casing resistance between electrodes KL. Various preferred embodiments described in the Vail Patents teach that it is of importance to measure said first, second, and third resistances to compensate current leakage measurements for casing thickness variations and for errors in placements of the voltage measurement electrodes along the casing to provide accurate measurements of current leakage into formation. Further, many embodiments of the Vail Patents do not require any assumption of the form of current flow along the casing to measure current leakage into formation. Therefore, for these reasons alone, French Patent No. 2,207,278 does not describe the methods and apparatus disclosed herein. There are many other differences between various embodiments of the Vail Patents and French Patent No. 2,207,278 which are described in great detail in the Statement of Prior Art for U.S. Ser. No. 07/754,965 dated Dec. 2, 1991 that issued as U.S. Pat. No. 5,223,794 on Jun. 29, 1993.

An abstract of an article entitled "Effectiveness of Resistivity Logging of Cased Wells by A Six-Electrode Tool" by N.V. Mamedov was referenced in TULSA ABSTRACTS as follows: "IZV.VYSSH.UCHEB, ZAVEDENII, NEFT GAZ no.7, pp. 11–15, July 1987. (ISSN 0445–0108; 5 refs; in Russian)", hereinafter the "Mamedov (1987)". It is the applicant's understanding from an English translation of that Mamedov (1987) that the article itself mathematically predicts the sensitivity of the type tool described in the above defined French Patent No. 2,207,278. Mamedov (1987) states that the tool described in French Patent No. 2,207,278 will only be show a "weak dependence" on the resistivity of rock adjacent to the cased well. By contrast, many embodiments of the Vail Patents, and the invention herein, provide measurements of leakage current and other parameters which are strongly dependent upon the resistivity of the rock adjacent to the cased well. Therefore, Mamedov (1987) does not describe the methods of measurement described herein.

U.S. Pat. No. 2,729,784, issued on Jan. 3, 1956 having the title of "Method and Apparatus for Electric Well Logging", and U.S. Pat. No. 2,891,215 issued on Jun. 16, 1959 having the title of "Method and Apparatus for Electric Well Logging", both of which issued in the name of Robert E. Fearon, henceforth called the "Fearon Patents" describe apparatus also having two pairs of voltage measurement electrodes which engage the interior of the casing. However, an attempt is made in the Fearon Patents to produce a "virtual electrode" on the casing in an attempt to measure leakage current into formation which provides for methods and apparatus which are unrelated to the Kaufman and Vail Patents cited above. The Fearon Patents neither provide calibration means, nor do they provide methods similar to those described in either the Kaufman Patent or the Vail Patents, to calibrate for thickness variations and errors in the placements of the electrodes. Therefore, the Fearon Patents do not describe the methods and apparatus disclosed herein.

William Banning Vail III is the sole inventor of the apparatus and methods of operation of that apparatus described as the Through Casing Resistivity Tool as set forth in the various Vail Patents defined above. William Banning Vail III has also conceived apparatus and methods of operation of the apparatus related to the Through Casing Resistivity Tool that are relevant to casing inspection, to the location of collars, and for other inspection purposes set forth herein. Mr. Steven T. Momii has provided substantial inventive input concerning methods of operating the Through Casing Resistivity Tool and related apparatus that are relevant to casing inspection, to the location of collars, and for other inspection purposes. The inventive input from Mr. Steven T. Momii has a bearing on at least one claim herein and he is therefore a co-inventor of the invention herein claimed. Therefore, the use of the Through Casing Resistivity Tool or any portion thereof to measure casing inspection properties including collar location has been the joint work of both inventors as claimed herein. Consequently, a first portion of the disclosure shall concern specification concerning the Through Casing Resistivity Tool. A last portion of the disclosure shall concern the methods of operation of the Through Casing Resistivity Tool and related apparatus for the purposes of casing inspection properties including collar location.

Accordingly, an object of the invention is to provide new apparatus and new methods of operation for the purposes of casing inspection.

It is yet another object of the invention to provide new apparatus and new methods of operation for the purposes of locating collars within cased wells.

It is another object of the invention to provide new apparatus and new methods of operation for the purposes of pipeline inspection.

It is yet another object of the invention to provide new apparatus and new methods of operation for the purposes of locating the joints where pipelines have been joined together.

It is yet another object of the invention to provide methods of operation of the Through Casing Resistivity Tool for the purpose of casing inspection and for inspecting pipelines.

And it is finally another object of the invention to provide new methods of operation of the Through Casing Resistivity Tool for the purpose of locating casing collars and for locating joints pipelines that are joined together.

The invention is described in three major different portions of the specification. In the first major portion of the specification, relevant parts of the text in U.S. Ser. No. 07/089,697 {Vail(542)} are repeated herein which describe apparatus defined in FIGS. 1, 3, 4, and 5 and which present relevant theory. The second major portion of the specification quotes relevant parts of U.S. Ser. No. 07/434,886 {Vail(626)} that describe the apparatus defined in FIG. 6 and particularly relevant equations used herein. The third major portion of the specification herein is concerned with disclosing the invention herein that provides new apparatus and methods of measurement for inspecting casing within cased wells; new apparatus and methods of measurement for locating collars within cased wells; new apparatus and methods of measurement for inspecting pipelines; and new apparatus and methods to locate joints were the oil and gas pipelines are joined.

Figure 1:
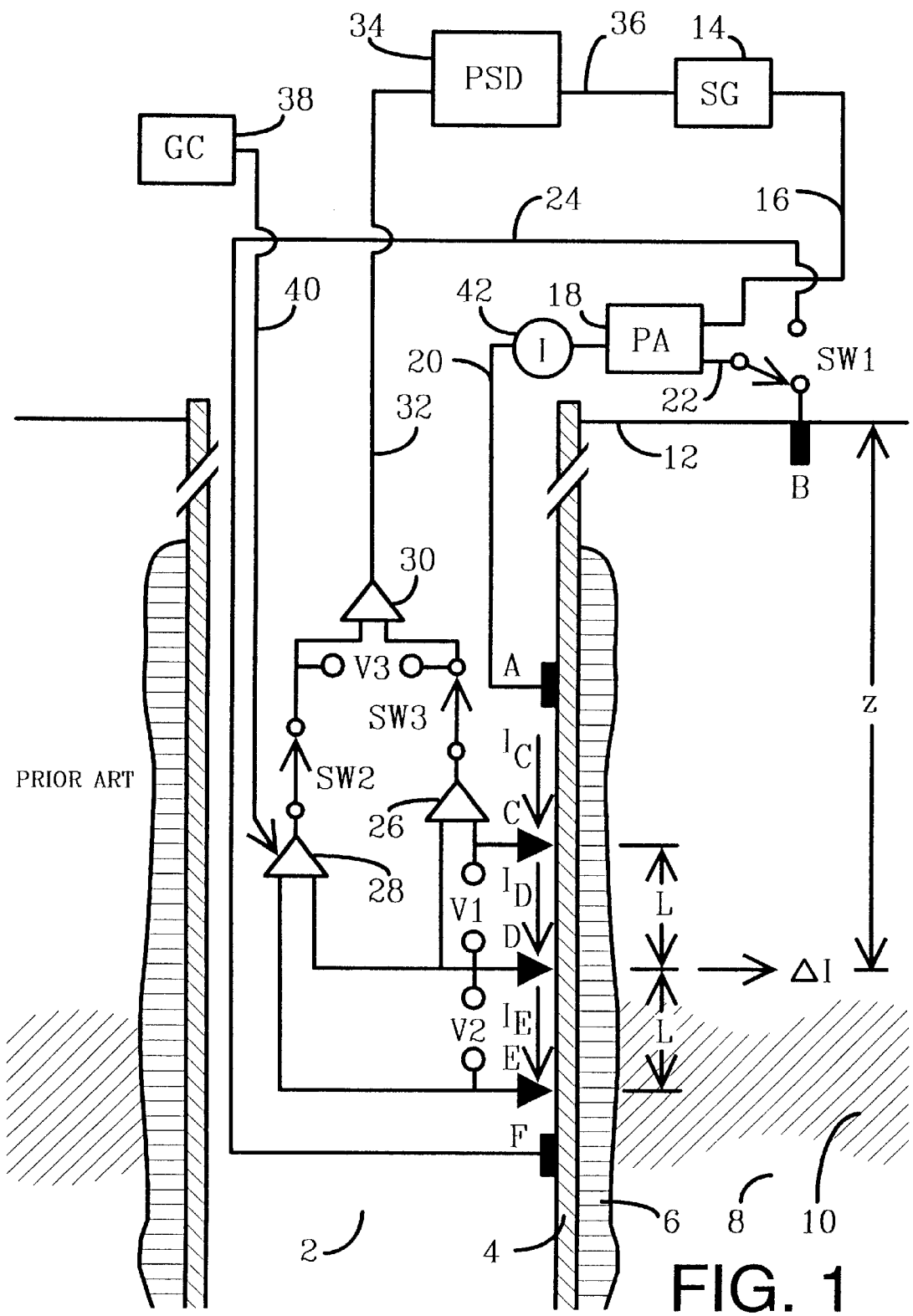
FIG. 1 is a sectional view of one preferred embodiment of the invention of the Through Casing Resistivity Tool (TCRT) which is marked with the legend "Prior Art".

From a technical drafting point of view, FIGS. 1, 2, 3, 4, and 5 in U.S. Ser. No. 07/089,697 {Vail(542)} and in those contained in this application are nearly identical. However, the new drawings have been re-done using computer graphics. The following excerpt is taken word-for-word from U.S. Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is ½ the peak-to-peak value of the sine wave.)

In general, with SW1 connected to electrode B, current is conducted through formation. For example, current ΔI is conducted into formation along the length 2L between electrodes C and E. However, if SW1 is connected to cable 24 and subsequently to electrode F, then no current is conducted through formation to electrode B. In this case, $I_C=I_D=I_E$ since essentially little current ΔI is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead." These lengths are respectively called "Characteristic Lengths" appropriate for the average resistivity of the formation and the type of casing used. A Characteristic Length is related to the specific length of casing necessary for conducting on approximately one-half the initial current into a particular geological formation as described below.

One embodiment of the invention described in U.S. Ser. No. 07/089,697 {Vail(542)} provides a preferred method of operation for the above apparatus in as follows: "The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp o-peak to 30 amps o-peak at a frequency of typically 1 Hz are introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
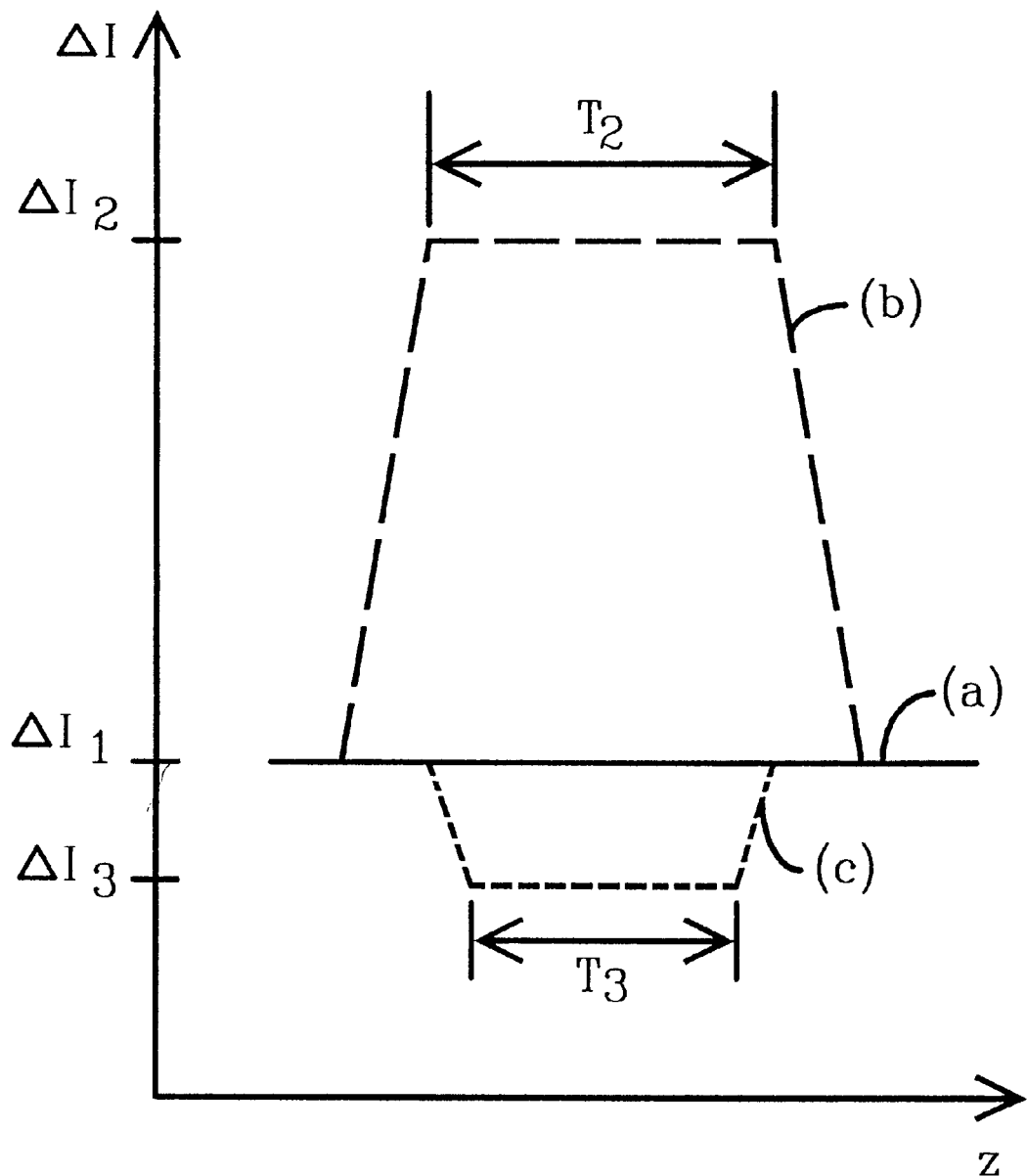
FIG. 2 shows $\Delta I$ vs. Z which diagrammatically depicts the response of the tool to different formations which is marked with the legend "Prior Art".

Quoting further from U.S. Ser. No. 07/089,697 {Vail (542)}: "FIG. 2 shows the differential current conducted into formation $\Delta I$ for different vertical positions z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
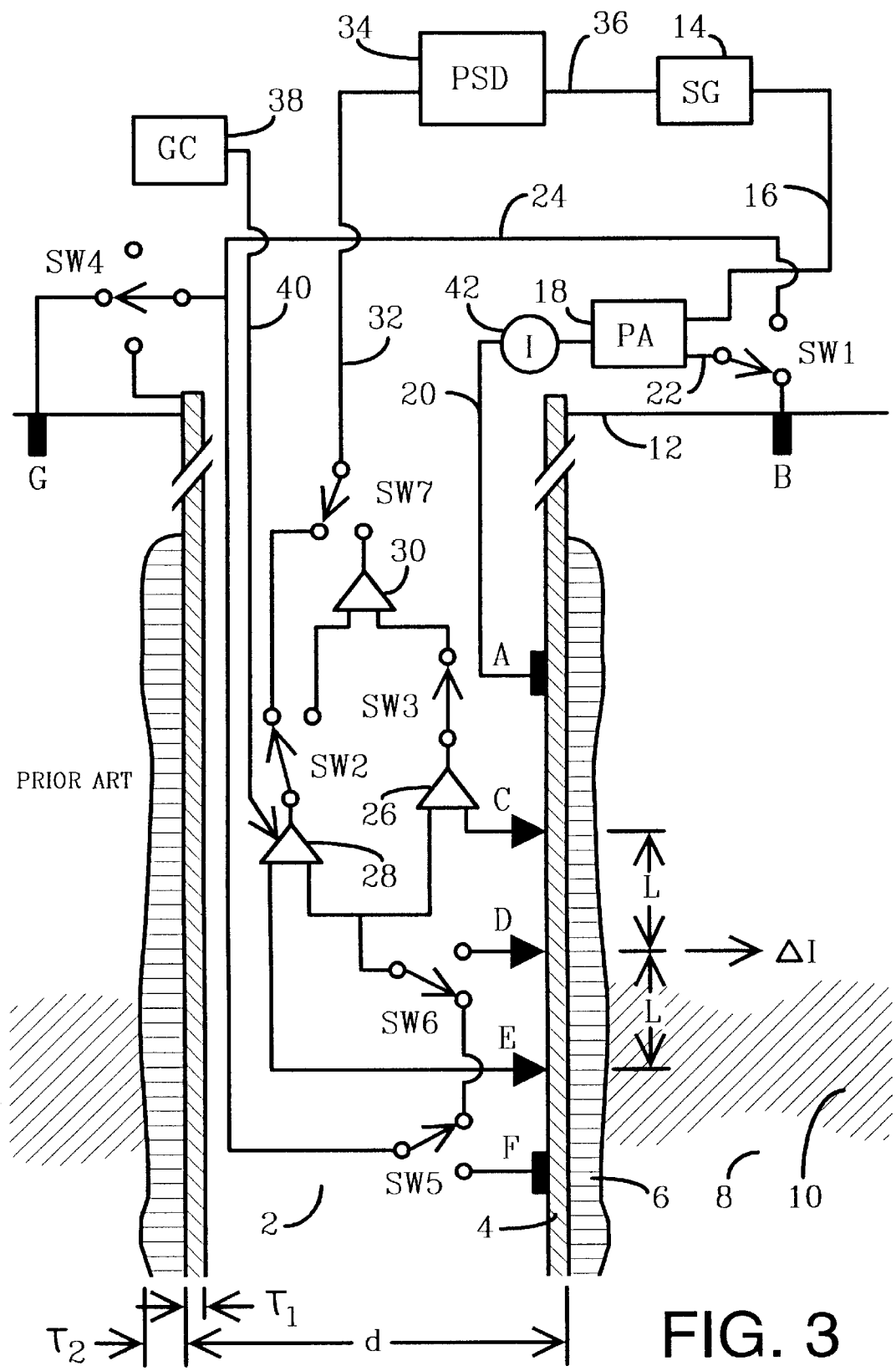
FIG. 3 is a sectional view of a preferred embodiment of the invention which shows how $V_o$ is to be measured that is marked with the legend "Prior Art".

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . .".

Quoting further from U.S. Ser. No. 07/089,697 {Vail (542)}: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
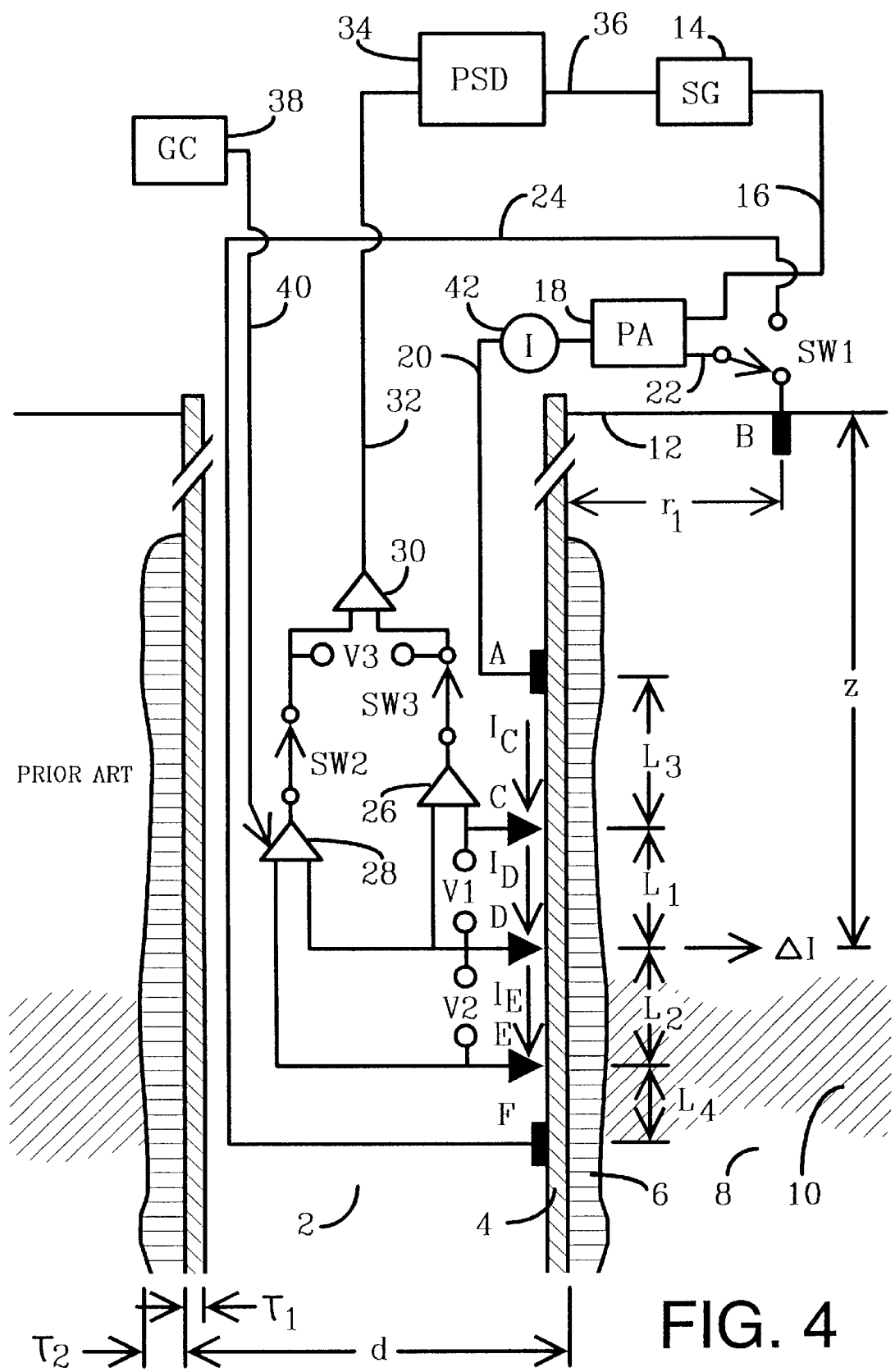
FIG. 4 is a sectional view of an embodiment of the invention which has voltage measurement electrodes which are separated by different distances that is marked with the legend "Prior Art".
Figure 5:
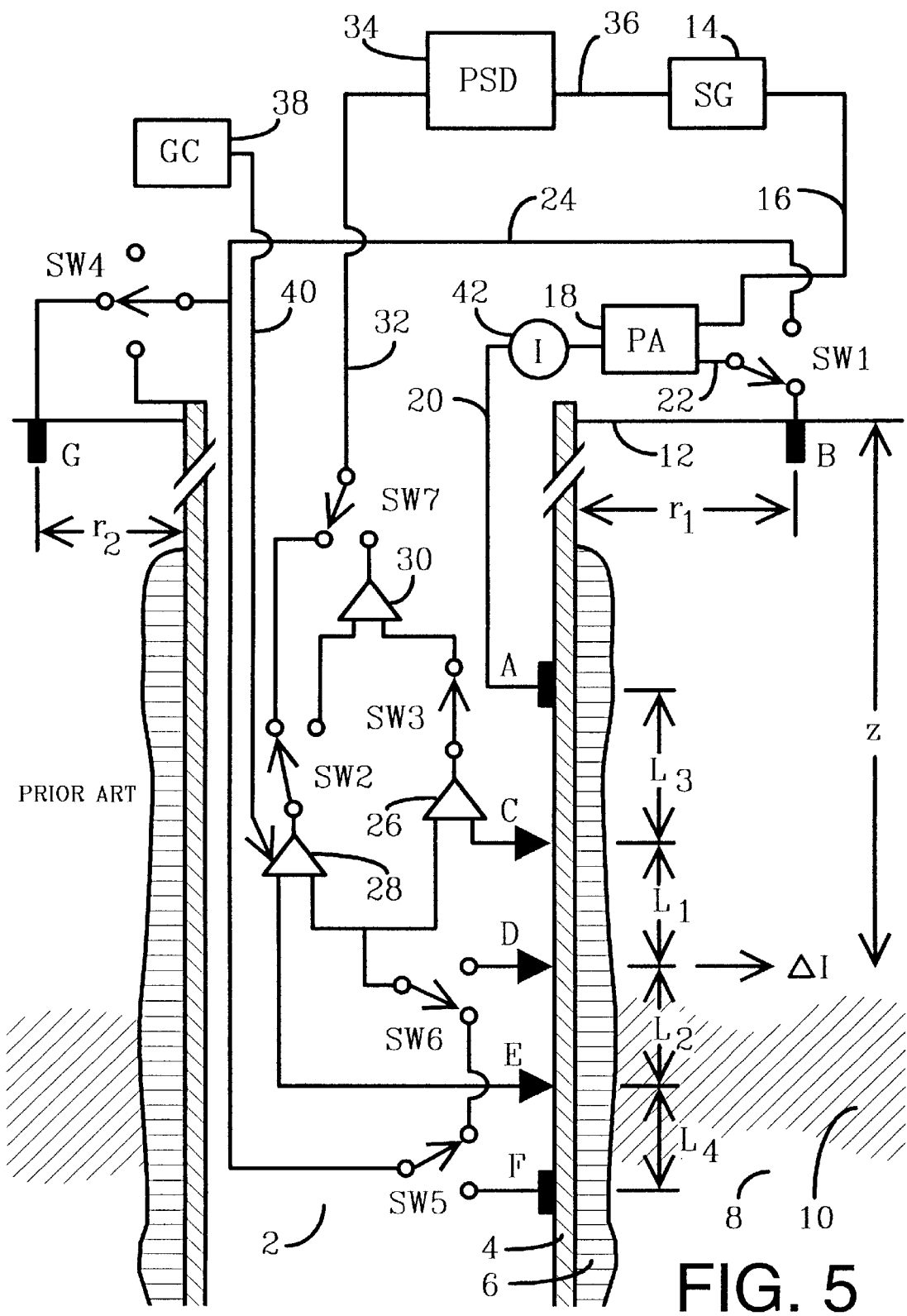
FIG. 5 is a sectional view of an embodiment of the invention which has electrodes which are separated by different distances and which shows explicitly how to measure $V_o$ that is marked with the legend "Prior Art".

Further quoting from U.S. Ser. No. 07/089,697 {(Vail (542)}: "FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And Z is the depth from the surface of the earth to electrode D. FIG. 5 is nearly identical to FIG. 3 except here too the distances $L_1$, $L_2$, $L_3$, $L_4$, $r_1$, and Z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

It should be noted that the lower limit of the frequency at which the current leakage is measured may actually be as low as 0.01 Hz as claimed in PML's European Patent No. 0329709. As long as the frequency of operation satisfies the conditions best explained in FIGS. 10 through 21 of U.S. Ser. No. 07/089,697 {Vail(542)}, then the frequency of operation of the Through Casing Resistivity Tool will provide acceptable results. Even step-wise-changing D.C. values of current introduced to Electrode A can be used and the measurements properly performed.

The local casing potential voltage $V_o$ may be independently and separately measured at a variety of different frequencies spanning the frequency range from D.C. to 20 Hz provided that the measurements satisfy the requirements set forth in U.S. Ser. No. 07/089,696 {Vail(542)}. If D.C. is used, then the D.C. current is step-wise changed and the resulting step-wise changes in the potential voltage are measured. These statements have been proven to be true based on experimental evidence at actual wellsites.

Further quoting from page 16 of U.S. Ser. No. 07/089, 697 {Vail(542)}: "As the frequency of the current I is increased, then eventually a frequency will be reached when most of the current simply flows from electrode A up the inside of the casing to the surface foe a return to electrode B. This is caused by the skin effect of the pipe. The skin effect causes an exponential attenuation of the electric field applied across the thickness of the steel casing, where the electric field is attenuated as follows:

$$\xi = \xi_o \, e^{-(\tau_1/\delta)} \qquad \text{Eq. 21}$$

The electric field $\xi_o$ is that applied to the inside of the casing by electrode A, $\xi$ is the field immediately outside of the pipe, $\tau_1$ is the thickness of the pipe, and $\delta$ is the skin depth given by the following:

$$\delta = (\pi f \, u \, \sigma)^{-\frac{1}{2}} \qquad \text{Eq. 22}$$

Here, f is the frequency in Hz, u is the magnetic permeability, and $\sigma$ is the conductivity of the material. (Please refer to 'Fields and Waves In Communication Electronics', Simon Ramo, et. al., Second Edition, John Wiley & Sons, 1984, p. 149.) Typical steel in borehole casing has a relatively permeability of 100, and the resistivity (1/$\sigma$) of typical steel is 10 micro-ohm-cm. Therefore, the above formula becomes:

$$\delta = (0.62/f^{1/2}) \text{ inches} \qquad \text{Eq. 23}$$

The critical frequency is the frequency where the skin depth equals the thickness of the pipe in question. The critical frequency for a 0.50 inch wall thickness in 1.54 Hz. The critical frequency for a 0.375 inch wall thickness if 2.73 Hz. Typically casing has wall thickness between 0.25 and 0.50 inches. If the frequency of operation is significantly less than the critical frequency, then the results for resistivity measurements need not be corrected for skin depth phenomena. For frequencies above the critical frequency, then the resistivity results need to be corrected for such phenomena. For very high frequencies of operation, then none of the current is conducted through the pipe into the formation but instead goes up the inside of the pipe from electrode A for a return across the earth's surface to electrode B."

It should be noted that the above theory has been used successfully at the following wells: at the Research Well in Fort Worth, Tex.; in PML's Test Well in Woodinville, Wash.; and at the MWX-2 Well, in Rifle, Colo.

It is evident that the skin depth of metal structures may be chosen in a predetermined manner from Equation 22 of U.S. Ser. No. 07/089,697 {Vail(542)}. Therefore, very low frequencies, with SW1 in FIG. 1 connected to Electrode B, current conducted between Electrode A and B flows into the adjacent geological formations. At high frequencies, with SW1 connected to Electrode B, the current conducted between Electrode A and B flows up the inside of the casing to the surface for a return along the surface. For such a high frequency situation, the current flowing along the casing is mostly physically conducted in an interior portion of the wall thickness of the casing equal to the skin depth of the material calculated by Equation 22 for a subsequent return to Electrode B. Changing the frequencies from a low frequency to a high frequency is an example of varying the frequency to produce skin depth variations in portions of the casing inspected by the TCRT.

With SW1 in FIG. 1 connected to Electrode F, then current is conducted between Electrodes A and F along the casing. For low frequencies, the current flows through the entire material of the casing. For higher frequencies, the current flows within a skin depth thickness of the interior of the casing between Electrode A and F. It is again evident that varying the frequency of operation of the TCRT results in measurements responsive to different portions of the casing. The existence of the skin depth at higher frequencies makes the casings appear as circuit elements having a resistive component and an inductive component per unit length. These casings are also called "reactive casings".

Similar comments apply to causing currents to flow along pipelines for pipeline inspection purposes. However, in pipelines, currents may be introduced on the inside of the pipeline and on the outside of the pipeline at various different frequencies. Again, varying the frequency of the current conducted along the pipeline varies the skin depth which can be used for pipeline inspection purposes.

Various equations are of importance herein. Those equations were described in detail in U.S. Ser. No. 07/434,886 {Vail(626)} which states: "The average resistance of the casing between electrodes D and E is defined as the quantity $R_A$, which is given as follows:

$$R_A = (R_1 + R_2)/2 \qquad \text{Equation 1.}$$

Therefore, there is a departure from average resistance of the first section of the casing between electrodes C and D defined as $\Delta R_1$ such that:

$$R_1 = R_A + \Delta R_1 \qquad \text{Equation 2.}$$

Furthermore, there is a departure from the average resistance of the second section of the casing between electrodes D and E defined as $\Delta R_2$ such that:

$$R_2 \, 32 \, R_A + \Delta R_2 \qquad \text{Equation 3.}$$

In the Preferred Null State of the apparatus, a current called the Null Current (defined as "$I_N$") is passed along the casing between electrodes C and E. Since relatively litter current is expected to flow through formation in this state, then essentially the same current $I_N$ flows between electrodes C and D and between electrodes D and E. Therefore, the output voltage from amplifier 30 is this situation is defined as $V_N$, which is given by the following:

$$V_N = a_3\{a_2 I_N (R_A + \Delta R_1) - a_1 I_N (R_A + \Delta R_2)\} \quad \text{Equation 4."}$$

Equation 28 in U.S. Ser. No. 07/434,886 {Vail(626)} is used to calculate the current leakage $\delta i_2$. That equation is incorporated herein by reference. For simplicity, the quantity $\Delta i_2$ shall henceforth be renamed herein as the quantity $\Delta I$. The quantity $\Delta I$ that is the current leakage is very important to calculate the apparent resistivity $\rho$ with the TCRT. The quantity $V_o$, the potential voltage, is described in that patent that is included herein by reference which is also important for measuring the apparent resistivity with the TCRT.

Equation 31 in U.S. Ser. No. 07,434,886 {(Vail(626)} is repeated herein with the above definition of $\Delta I$ as follows:

$$R_c = V_o / \Delta I$$

Here, $R_c$ is the "contact resistance". The resistivity $\rho$ is then given by the following relationship that is Equation 33 in U.S. Ser. No. 07,434,886 {Vail(626)}:

$$\rho = K R_c$$

The parameter K is called the "Calibration Constant". Various methods have been used to calculate it and to determine it empirically. A closed form algebraic equation that appears to give reasonable agreement with empirically determined values of K is presented below as follows:

$$K = \pi L / 2Y \quad \text{Equation 34.}$$

$$Y = \{Ln[(2L/a)(1+X)] + a/2L - X\} \quad \text{Equation 35.}$$

$$X = \{1 + (a/2L)^2\}^{1/2} \quad \text{Equation 36.}$$

The equation numbers 34, 35, and 36 above are used to prevent any confusion with Equations No. 1 through 33 in U.S. Ser. No. 07,434,886 {Vail(626)}. Equation 3.24 on page 75 of *Earth Conduction Effects in Transmission Systems*, Sunde, E.D., 1949, D. Van Nostrand Company, Inc. New York, N.Y., was used in combination with the theory of the Through Casing Resistivity Tool set forth in The Vail Patents to obtain the above results. Here, L is the distance between Electrodes C and E. Here, L is twice the electrode spacing for evenly spaced Electrodes C, D, and E. The definition of L here applies solely to Equations 34, 35, and 36 and 37 herein. The parameter a is the radius of the pipe present that is the diameter d of the pipe divided by 2.

In the limit of L being much larger than d, and using other approximations, Equation 34 is then given by the following final approximation:

$$K = 2\pi L / \{Ln \, 4L/d\} \quad \text{Equation 37.}$$

This same equation can be obtained from Equation 30 stated in U.S. Ser. No. 07/434,886 {Vail(626)} and Equation No. 6 in U.S. Ser. No. 06/927,115 {Vail(989)}.

Equations 34, 35, and 36 provide good agreement with the values of K empirically determined at wellsites including The Research Well in Forth Worth, Tex.; PML's Test Well in Woodinville, Wash.; and at the MWX-2 Well in Rifle, Colo.

It has been expected from theory that the Calibration Constant K should depend primarily on the electrode spacing distance and the diameter of the pipe as clearly shown in Equations 34, 35, 36 and 37 above. Very near the end of casing strings, or in thin formations, or if cement is present, certain corrections may be needed to be done to K. Such corrections made to the Calibration Constant K generate new constants defined as K(EFFECTIVE) abbreviated as K(EFF) to be used in place of K above. After those corrections are done, then a modified form of Equation 33 in U.S. Ser. No. 07/434,886 {(Vail(626)} giving the resistivity $\rho$ is to be used as follows:

$$\rho = K(EFF) R_c \quad \text{Equation 38.}$$

It is sometimes helpful to clearly state that the apparent resistivity on the inside of the casing is being measured with the Through Casing Resistivity Tool. Therefore, Equation 38 can be re-written as follows where $\rho$(APP) is defined as the apparent resistivity being measured with the TCRT. Equation 38 then becomes:

$$\rho(APP) = K(EFF) R_c \quad \text{Equation 39.}$$

Figure 6:
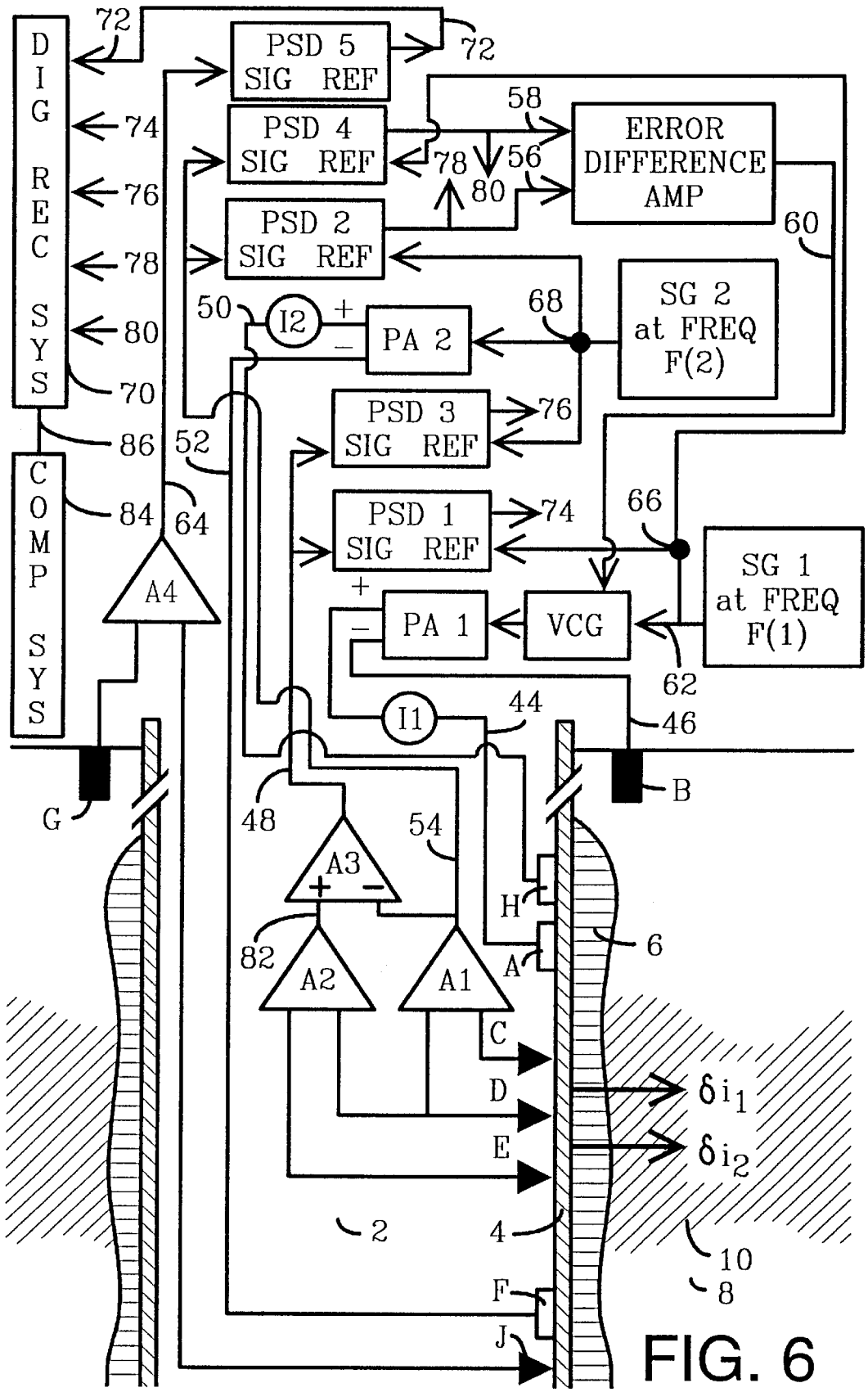
FIG. 6 is a sectional view of an embodiment of the invention which provides multi-frequency operation to compensate for errors of measurement marked with the legend "Prior Art".

Having completed the review of theory of the Through Casing Resistivity Tool, it is now necessary to describe FIG. 6 in detail. FIG. 6 was first described in U.S. Ser. No. 07/434,886 {Vail(626)} which states: "For the purpose of logical introduction, the elements in FIG. 6 are first briefly compared to those in FIGS. 1–5. Elements No. 2, 4, 6, 8, and 10 have already been defined. Electrodes A, B, C, D, E, F, G and the distances $L_1$, $L_2$, $L_3$, and $L_4$ have already been described. The quantities $\delta i_1$ and $\delta i_2$ have already been defined in the above text. Amplifiers labeled with legends A1, A2, and A3 are analogous respectively to amplifiers 26, 28, and 30 defined in FIGS. 1, 3, 4, and 5. In addition, the apparatus in FIG. 6 provides for the following:

(a) two signal generators labeled with legends "SG 1 at Freq F(1)" and "SG 2 at Freq F(2)";

(b) two power amplifiers labeled with legends "PA 1" and "PA 2";

(c) a total of 5 phase sensitive detectors defined as "PSD 1", "PSD 2", "PSD 3", "PSD 4", and "PSD 5", which respectively have inputs for measurement labeled as "SIG", which have inputs for reference signals labeled as "REF", which have outputs defined by lines having arrows pointing away from the respective units, and which are capable of rejecting all signal voltages at frequencies which are not equal to that provided by the respective reference signals;

(d) an "Error Difference Amp" so labeled with this legend in FIG. 6;

(e) an instrument which controls gain with voltage, typically called a "voltage controlled gain", which is labeled with legend "VCG";

(f) an additional current conducting electrode labeled with legend "H" (which is a distance $L_5$—not shown—above electrode A);

(g) an additional voltage measuring electrode labeled with legend J (which is a distance $L_6$—not shown—below electrode F);

(h) current measurement devices, or meters, labeled with legends "I1" and "I2";

(i) and differential voltage amplifier labeled with legend "A4" in FIG. 6."

U.S. Ser. No. 07/434,886 {Vail(626)} further describes various cables labeled with legends respectively 44, 46, 48, 50, 52, 54, 56, 58, 60, 62, and 64 whose functions are evident from FIG. 6.

U.S. Ser. No. 07/434,886 {Vail)626)} further states: "The outputs of PSD 1, 2, 3, and 4 are recorded on a digital recording system 70 labeled with legend "DIG REC SYS". The respective outputs of the phase sensitive detectors are connected to the respective inputs of the digital recording system in FIG. 6 according to the legends labeled with numbers 72, 74, 76, 78, and 80. One such connection is expressly shown in the case of element no. 72."

U.S. Ser. No. 07/434,886 {Vail(626)} teaches in great detail that it is necessary to accurately measure directly, or indirectly, the resistance between electrodes C-D (herein defined as "R1") and the resistance between electrodes D-E (herein defined as "R2") in FIGS. 1, 3, 4, 5 and 6 to precisely measure current leakage into formation and formation resistivity from within the cased well. Please refer to Equations 1–33 in U.S. Ser. No. 07/434,886 {Vail(626)} for a thorough explanation of this fact. The parent application, U.S. Ser. No. 06/927,115 {Vail(989)} and the following Continuation-in-Part Application U.S. Ser. No. 07/089,697 {Vail(542)} taught that measurement of the resistance of the casing between voltage measurement electrodes that engage the interior of the casing are very important to measure formation resistivity from within the casing.

Using various different experimental techniques that result in current flow along the casing between current conducting electrodes A and F in FIGS. 1, 3, 4, 5, and 6 result in obtaining first compensation information related to a first casing resistance defined between voltage measurement electrodes C and D. Similarly, using various different experimental techniques that result in current flow along the casing between current conducting electrodes A and F in FIGS. 1, 3, 4, 5, and 6 result in obtaining second compensation information related to a second casing resistance between voltage measurement electrodes D and E. FIGS. 1, 3, 4, 5, and 6 all provide additional means to cause current to flow into formation, and the measurements performed while current is flowing into the formation is called the measurement information related to current flow into formation. Such measurement information is used to determine a magnitude relating to formation resistivity. Various other figures in the Vail Patents provide means to provide measurement information, and respectively first and second compensation information, along with additional information in several cases.

Various embodiments of the inventions in the Vail Patents provide many different manners to introduce current onto the casing, a portion of which is subsequently conducted through formation. Various embodiments in the Vail Patents provide many different methods to measure voltage levels at a plurality of many points on the casing to provide a potential voltage profile along the casing which may be interpreted to measure the current leaking off the exterior of the casing from within a finite vertical section of the casing. Regardless of the details of operation chosen however, many embodiments disclosed in the Vail Patents provide a minimum of 3 spaced apart voltage measurement electrode means that provides measurement information related to current flow into the geological formation, and respectively, first and second compensation information related to measurements of at least two separate casing resistances between the three spaced apart voltage measurement electrodes, wherein the measurement information and the first and second compensation information are used to determine a magnitude related to formation resistivity.

Now that a description of the Through Casing Resistivity Tool has been completed, it is now appropriate to describe its use for various casing and pipeline inspection functions.

It is evident from the equations in U.S. Ser. No. 07/434,886 {Vail(626)} that the quantities R1 and R2 can therefore be measured at various frequencies with the Through Casing Resistivity Tool. At low frequencies, the average thickness of the casing present between electrodes spaced a distance of "ELECTSP" apart which stands for "Electrode Spacing" is approximately given by the following:

$$\text{AVE } (66\ a) = \rho_c(\text{ELECTSP})/2\pi a R1 \qquad \text{Equation 40.}$$

Figure 7:
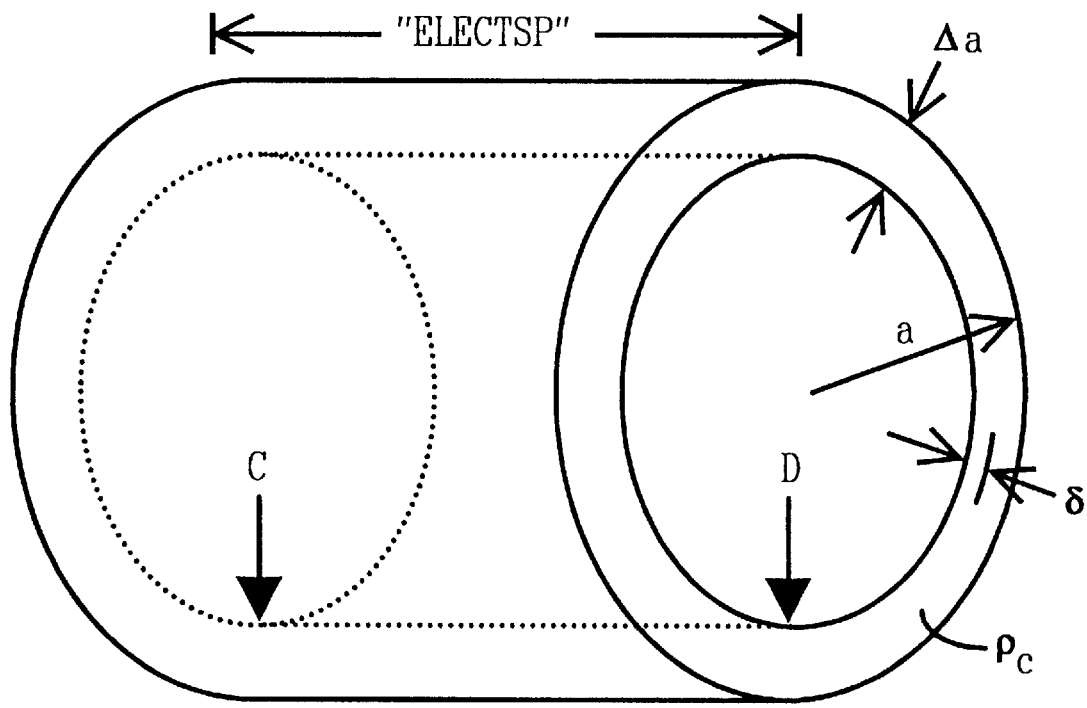
FIG. 7 shows a model for calculating the average thickness of casings and pipelines.

Please refer to FIG. 7 for a description of these quantities. Here, the quantity "AVE ($\Delta a$)" is the average wall thickness of the material present in the casing or pipeline between Electrodes C-D separated by the distance one ELECTSP as measured at "low frequencies". The quantity "a" is the average O.D. of the casing or pipeline. $\rho_c$ is the resistivity in ohm-meters of the material comprising the casing or pipeline. R1 is the measured resistance in ohms between Electrodes C and D as previously defined.

As has been shown above, R1 is expected to be a function of the frequency at higher frequencies. At the lower frequencies, resistances are measured as just explained herein. At higher frequencies, inductive effects become very important. At sufficiently high frequencies, the skin effect dominates. Therefore, the magnitude and phase of the complex impedance representing the frequency dependent resistance R1 can be determined. Measurements of the impedance of the casing or pipeline at low frequencies gives the average wall thickness as above for a fixed $\rho_c$. Measurements of the impedance of the casing or pipeline at higher frequencies gives indications of imperfections in the casing or pipelines. Measurements of the impedance of the casing at higher frequencies gives indications of the casing collars present. The change in mass caused by the casing collars appear as changes in inductance of the casing and cause dramatic changes in the impedance measured at higher frequencies. FIG. 7 shows electrodes C and D measuring the impedance at higher frequencies. The skin depth is shown in FIG. 7 for reference.

The casing shown in FIG. 7 has a resistance per unit length having the symbol r which has the units of ohms per meter. The casing shown in FIG. 7 at a given frequency has an inductance per meter having the symbol (IND) and which has the units of henries/meter. At a given frequency f, there is a phase angle $\Theta$ between the quantities defined as follows:

$$\Theta = \text{ARCTAN } \{2\pi f(\text{IND})/r\} \qquad \text{Equation 41.}$$

A casing or pipeline having the above related frequency dependent effects is called an inductive or reactive casing or pipeline. Choosing the operating frequency to cause such effects is called choosing the frequency of operation to make the casing or pipeline inductive or reactive. Those frequencies can be chosen to enhance inductive effects to locate collars in casings, imperfections in casings, corrosion holes in casings, imperfections in pipes, imperfections in pipelines, and to locate joints or breaks in pipelines.

Figure 8:
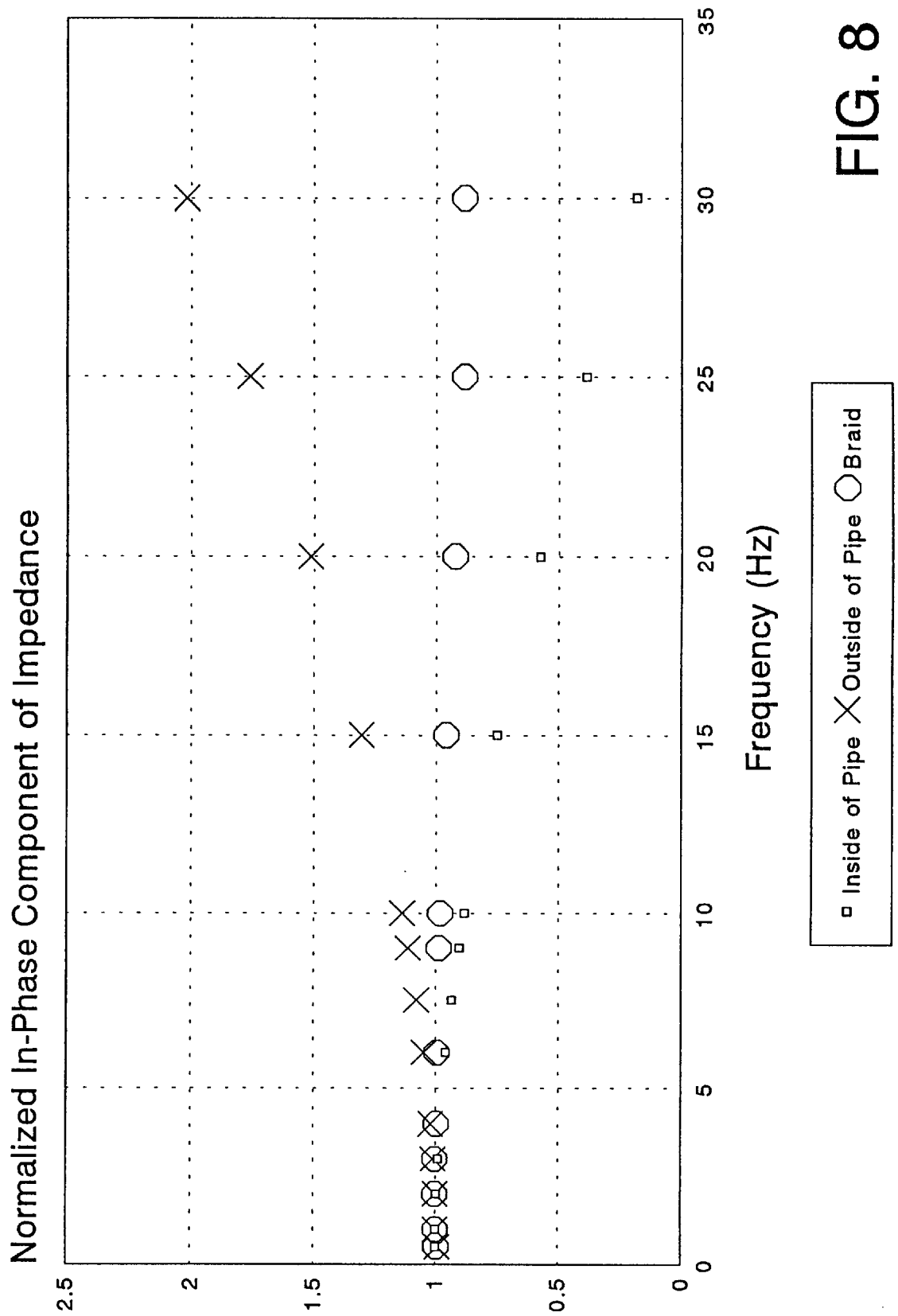
FIG. 8 shows the Normalized In-Phase Component of the impedance between two electrodes on the inside of a metallic steel pipe and two electrodes on the outside the pipe for different frequencies in Hz.

FIG. 8 shows the Normalized In-Phase Component of the impedance between two electrodes on the inside of a metallic steel pipe vs. two electrodes on the outside the pipe for different frequencies in Hz. This pipe is standard 7 inch O.D. casing having a wall thickness of 0.360 inches. Here, Electrodes C-D are located on the inside of the casing designated by the "dots". There is an identical pair of electrodes at the same position on the outside of the casing designated by the "x's". The error in the system is shown by the circles "braid" that should have been 1.00 for all frequencies if the machine was behaving perfectly. FIG. 8 clearly shows that the TCRT can measure resistive and inductive effects of the casing. The effects due to the skin effect at higher frequencies is clearly evident.

Figure 9:
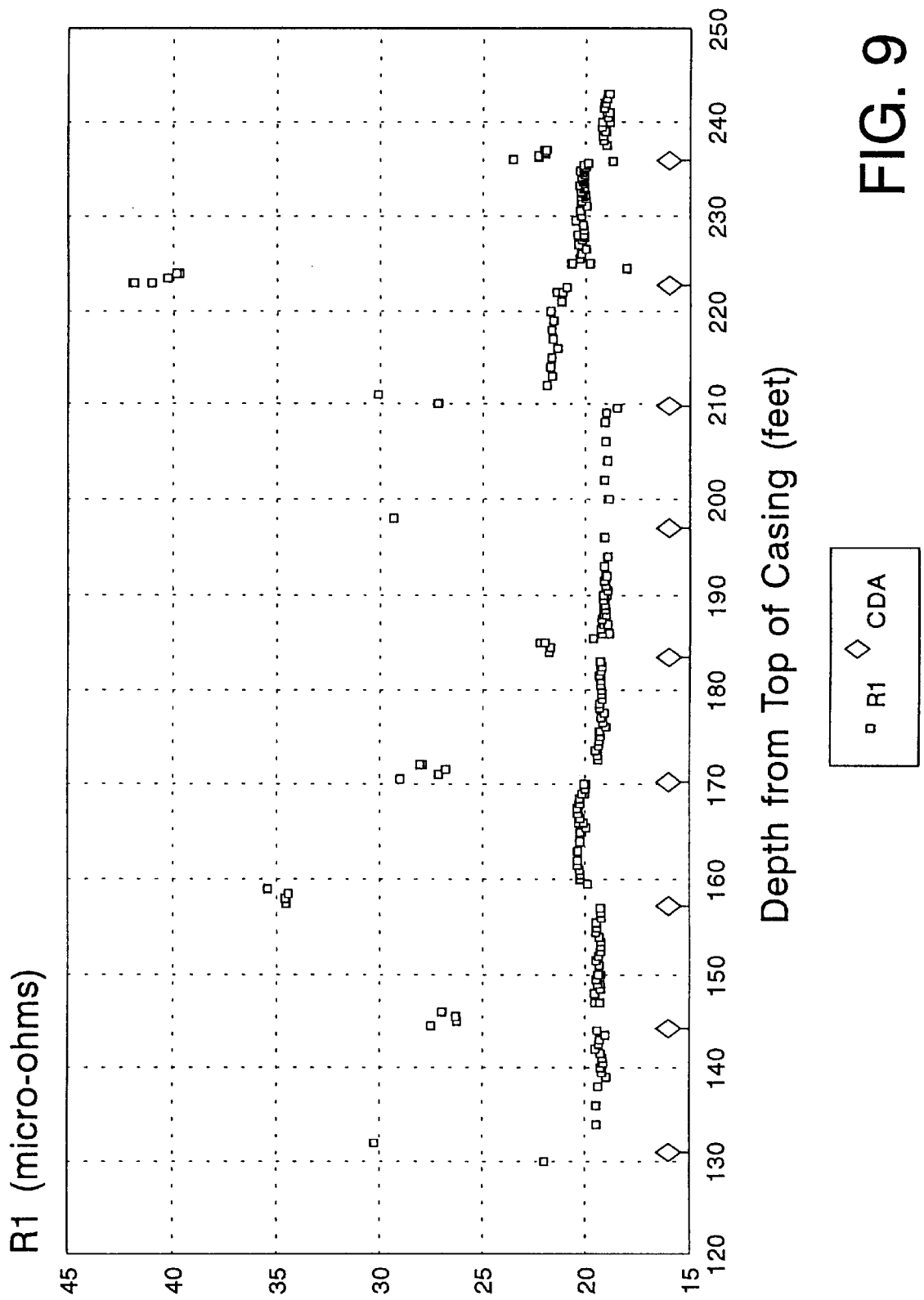
FIG. 9 shows R1 in units of micro-ohms vs. Depth in feet measured with the TCRT in PML's Test Well Woodinville, Wash. at the frequency of 1.25 Hz.

FIG. 9 shows R1 in units of micro-ohms vs. Depth in feet measured with the TCRT in PML's Test Well Woodinville, Wash. at the frequency of 1.25 Hz. The casing installed in PML's Woodinville, Wash. Test Well is 7 inch O.D. casing, Type K-55, 26 pounds/foot having an average wall thickness of 0.362 inches. Special casing nipples were fabricated. The collars are located about 13 feet 1½ inches apart centerline-to-centerline of the collars. It is evident that R1 can be used to determine the location of the collars. Changes in the resistance of the casing can be used to determine the location of the collars. On each casing length not having a collar, there is a "baseline" of the values of the resistance R1 vs. Depth that are evident. That is the "baseline resistance of the casing" or simply "the baseline resistance". The collars are identified as "significant departures" or "significant excursions" from that "baseline resistance". A minimum change in the baseline resistance of 2% is necessary to qualify as a "significant departure" from the baseline resistance. Therefore, the collars are identified by significant departures from the baseline resistance. Significant departures from the baseline resistance also mean that there are at least two points over the anticipated length of a collar (typically 9 inches) that show the minimum changes from the baseline resistance. The collars also tend to repeat at repetitive distances, here about every 13 feet. Therefore, the collars are further identified by the significant departures from the baseline resistance which tend to repeat.

Figure 10:
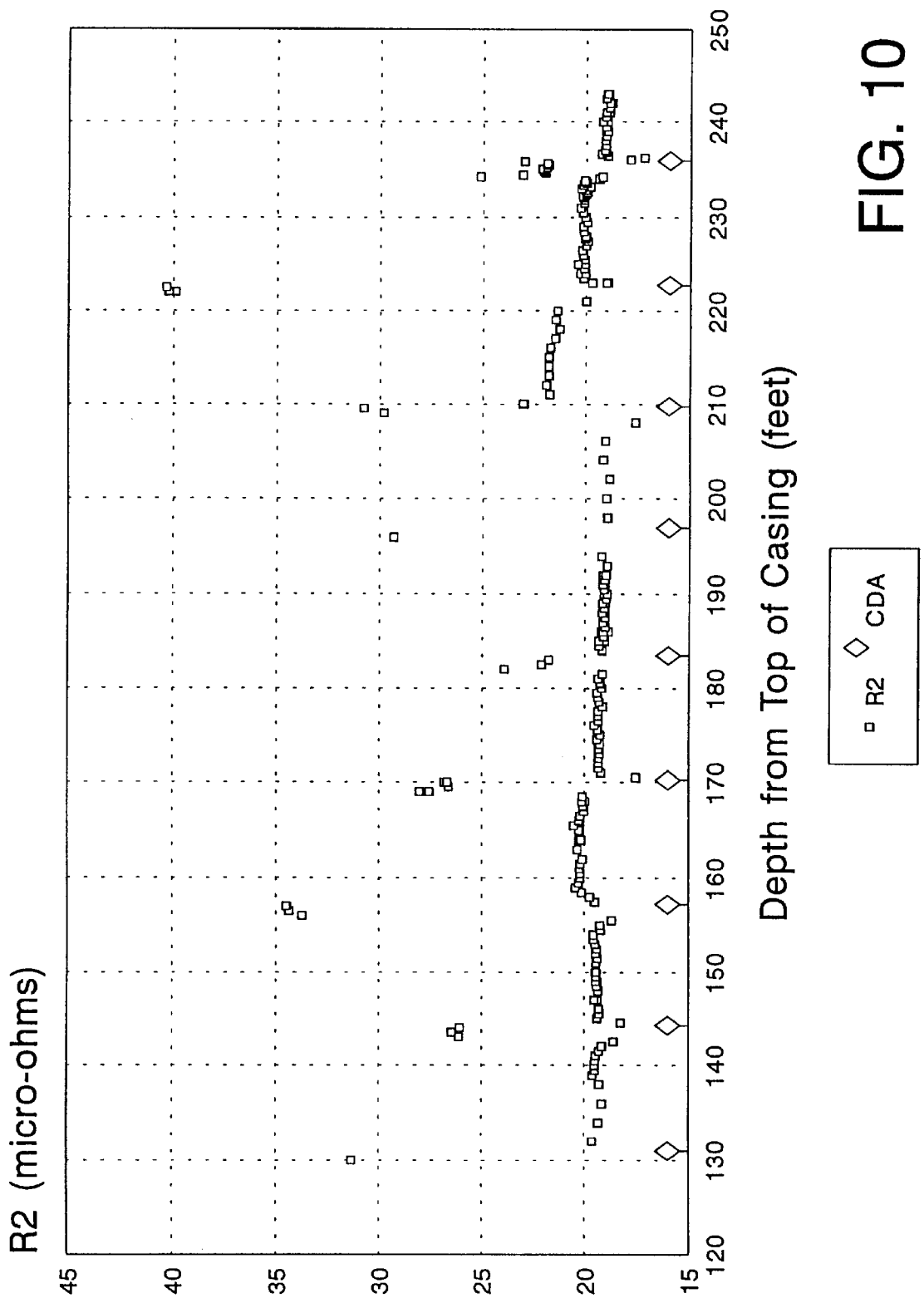
FIG. 10 shows R2 in units of micro-ohms vs. Depth in feet measured with the TCRT in PML's Test Well in Woodinville, Wash. at the frequency of 1.25 Hz.

FIG. 10 shows R2 in units of micro-ohms vs. Depth in feet measured with the TCRT in PML's Test Well in Woodinville, Wash. at the frequency of 1.25 Hz. Here again, the significant departures or significant excursions from the baseline resistance identify the collars.

Figure 11:
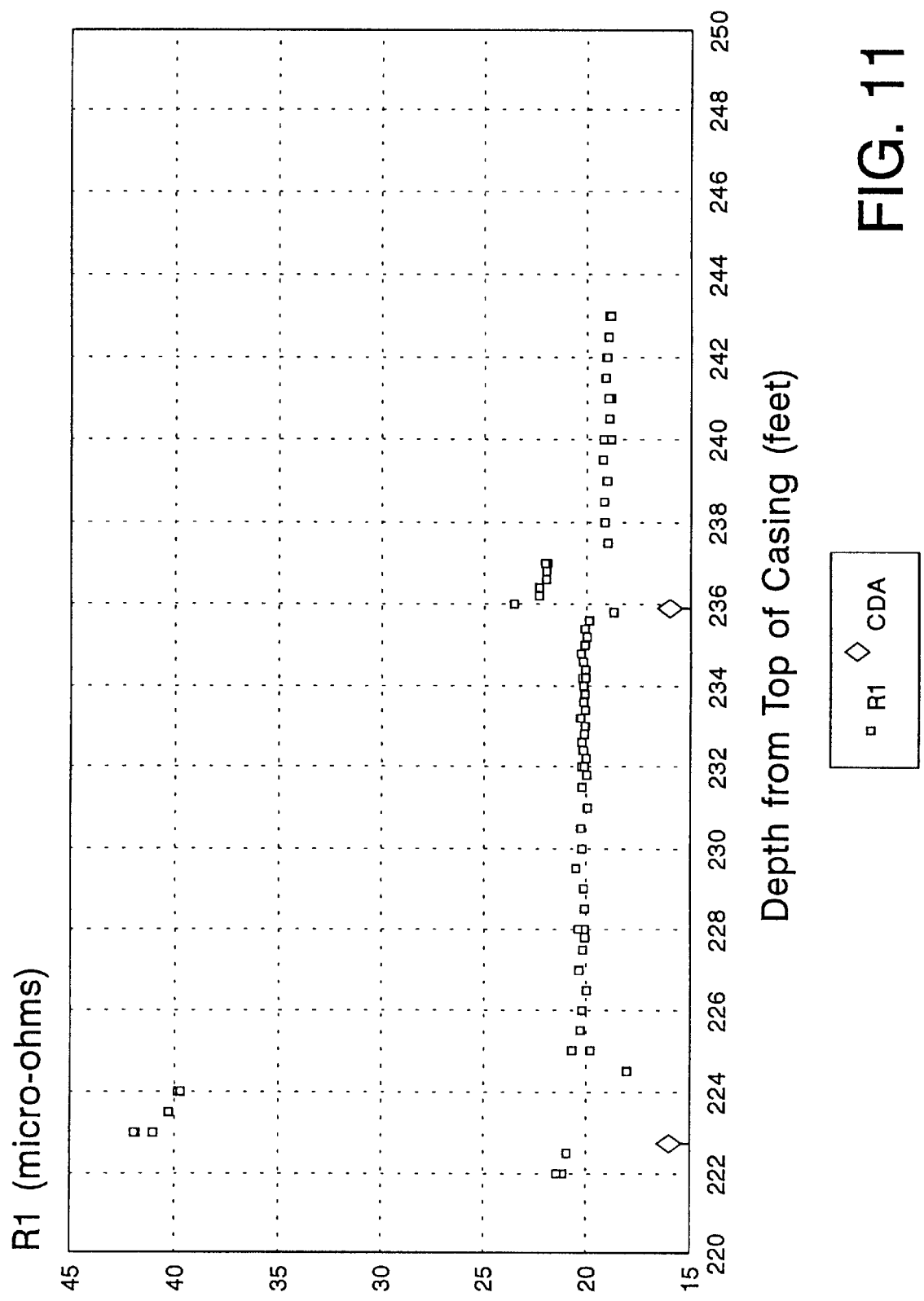
FIG. 11 shows R1 in units of micro-ohms vs. Depth in feet on an expanded scale measured with the TCRT in PML's Test Well in Woodinville, Wash. at the frequency of 1.25 Hz.

FIG. 11 shows R1 in units of micro-ohms vs. Depth in feet on an expanded scale measured with the TCRT in PML's Test Well in Woodinville, Wash. at the frequency of 1.25 Hz. Here again significant departures from the baseline resistance identify the collars.

Figure 12:
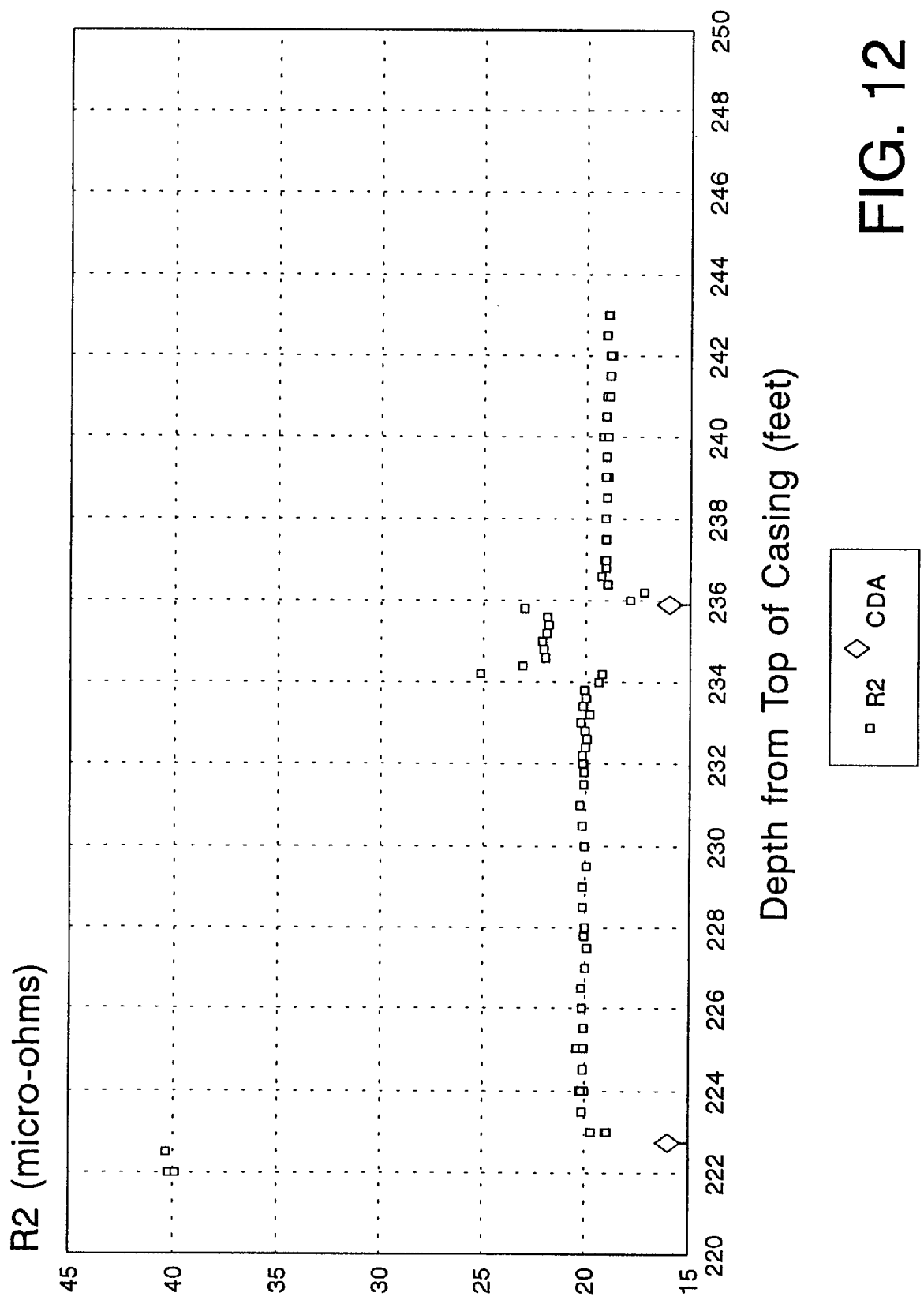
FIG. 12 shows R2 in units of micro-ohms vs. Depth in feet on an expanded scale measured with the TCRT in PML's Test Well in Woodinville, Wash. at the frequency of 1.25 Hz.

FIG. 12 shows R2 in units of micro-ohms vs. Depth in feet on an expanded scale measured with the TCRT in PML's Test Well in Woodinville, Wash. at the frequency of 1.25 Hz. Here again significant departures from the baseline resistance identify the collars.

Figure 13:
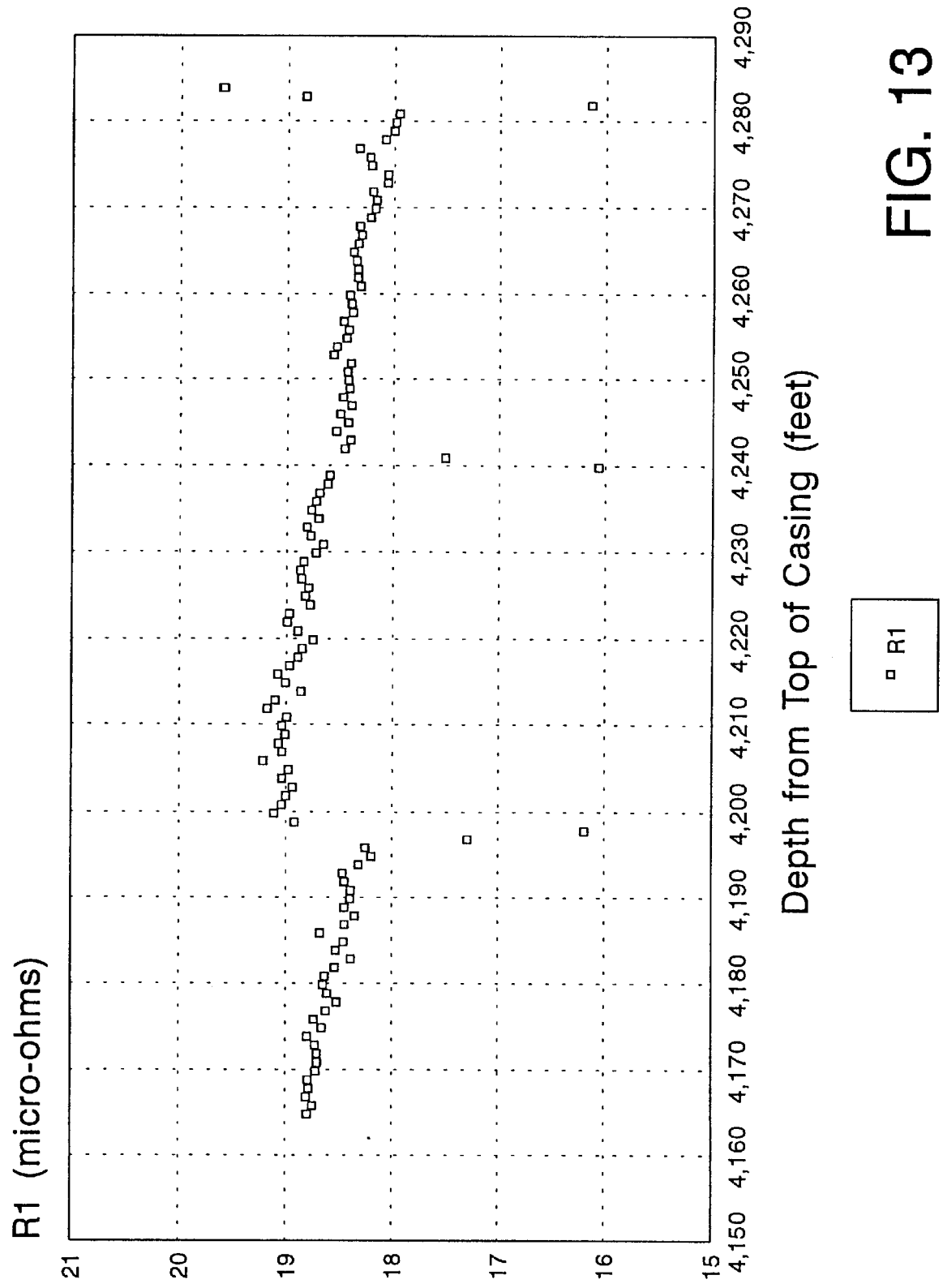
FIG. 13 shows R1 in units of micro-ohms vs. Depth in feet measured with the TCRT at the MWX-2 Well in Rifle, Colo. at the frequency of 1.25 Hz.

FIG. 13 shows R1 in units of micro-ohms vs. Depth in feet measured with the TCRT at the MWX-2 Well in Rifle, Colo. at the frequency of 1.25 Hz. The casing installed in the MWX-2 Well in Rifle, Colo. is 7 inch O.D. casing, Type N-80, which has a weight of 29 pounds/foot. At 1.25 Hz, significant excursions from the baseline resistance identify the collars.

Figure 14:
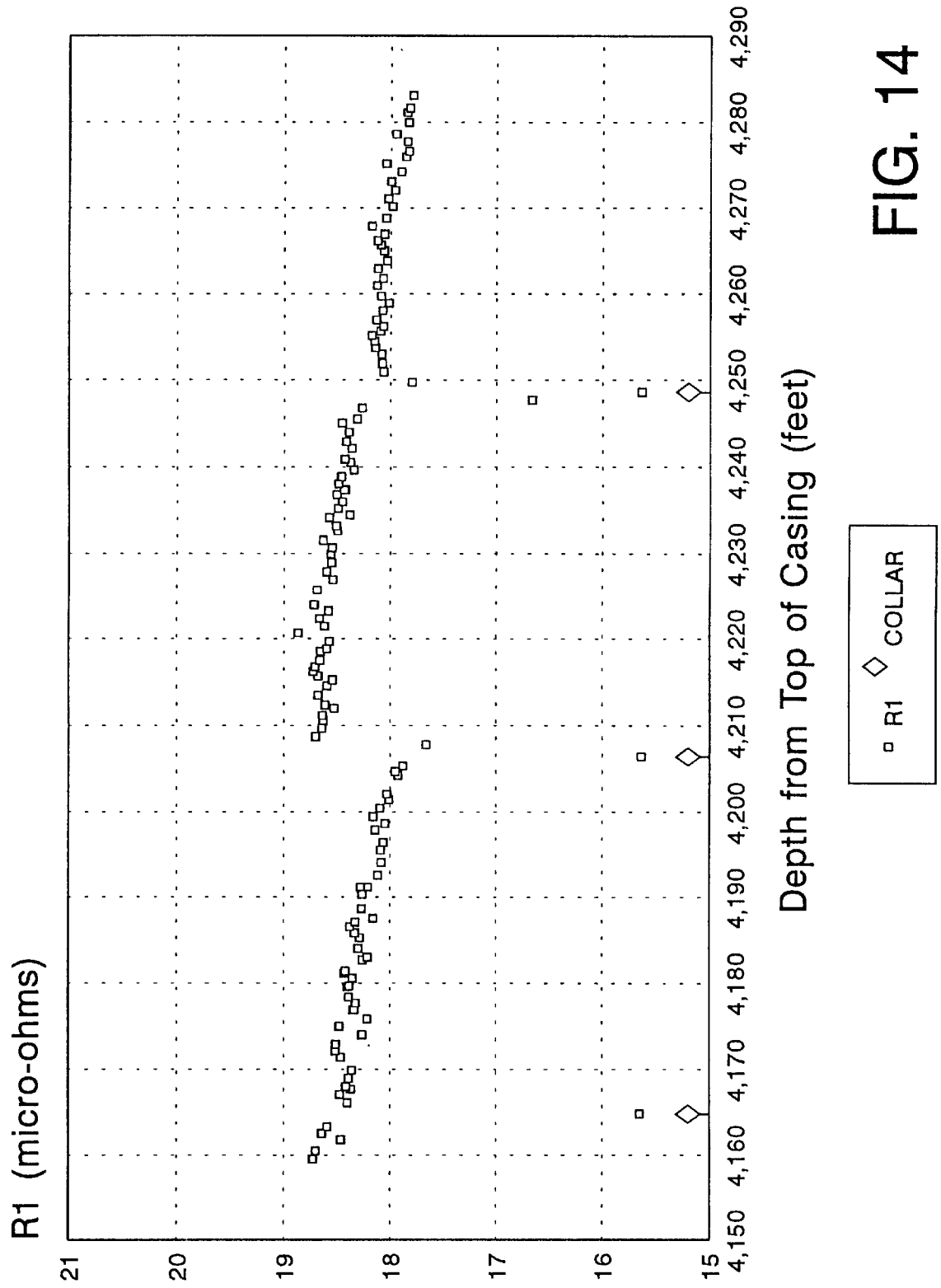
FIG. 14 shows R1 in units of micro-ohms vs. Depth in feet measured with the TCRT at the MWX-2 Well located in Rifle, Colo. at the frequency of 0.2 Hz.

FIG. 14 shows R1 in units of micro-ohms vs. Depth in feet measured with the TCRT at the MWX-2 Well located in Rifle, Colo. at the frequency of 0.2 Hz. At 0.2 Hz, significant excursions from the baseline resistance identify the collars.

Figure 15:
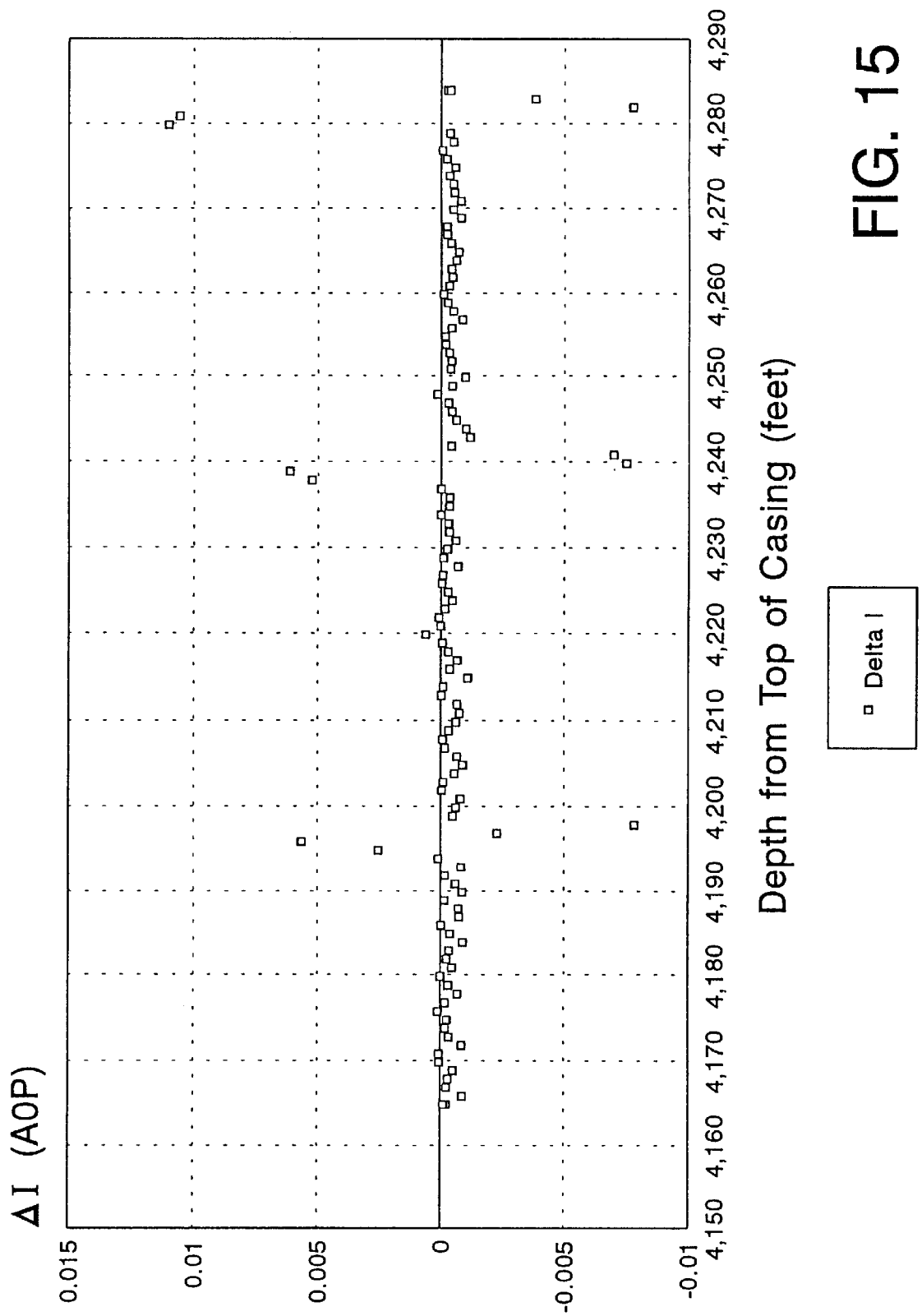
FIG. 15 shows ΔI in amps 0-peak vs. Depth in feet measured with the TCRT at the MWX-2 Well located in Rifle, Colo. at the frequency of 1.25 Hz.

FIG. 15 shows ΔI in amps 0-peak vs. Depth in feet measured with the TCRT at the MWX-2 Well located in Rifle, Colo. at the frequency of 1.25 Hz. Please notice that the frequency of operation here is so high at 1.25 Hz, that very little current leaks into the formation. Here, the skin effect limits the amount of current leaking into the formation as discussed above. However, inductive effects or skin effects are evident when the collars are crossed. Therefore, significant excisions in the "apparent leakage current" from the "baseline leakage current" at sufficiently high frequencies where the actual current leakage is dominated by the skin effect are able to locate the collars.

Figure 16:
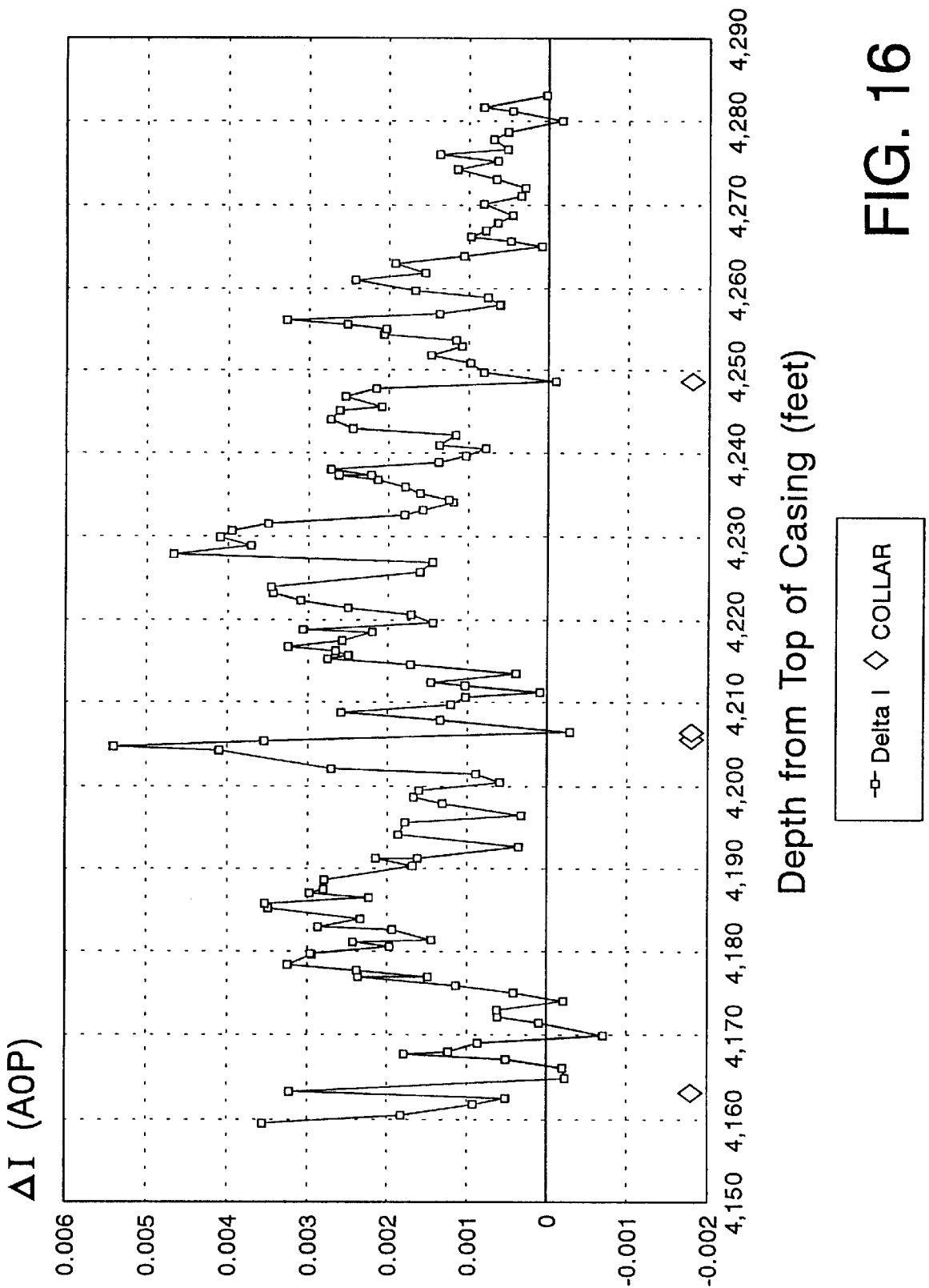
FIG. 16 shows ΔI in amps 0-peak vs. Depth in feet measured with the TCRT at the MWX-2 Well located in Rifle, Colo. at the frequency of 0.2 Hz.

FIG. 16 shows ΔI in amps 0-peak vs. Depth in feet measured with the TCRT at the MWX-2 Well located in Rifle, Colo. at the frequency of 0.2 Hz. At the lower frequencies when resistive effects dominate, it is very difficult to locate the collars from changes in the baseline leakage current.

Figure 17:
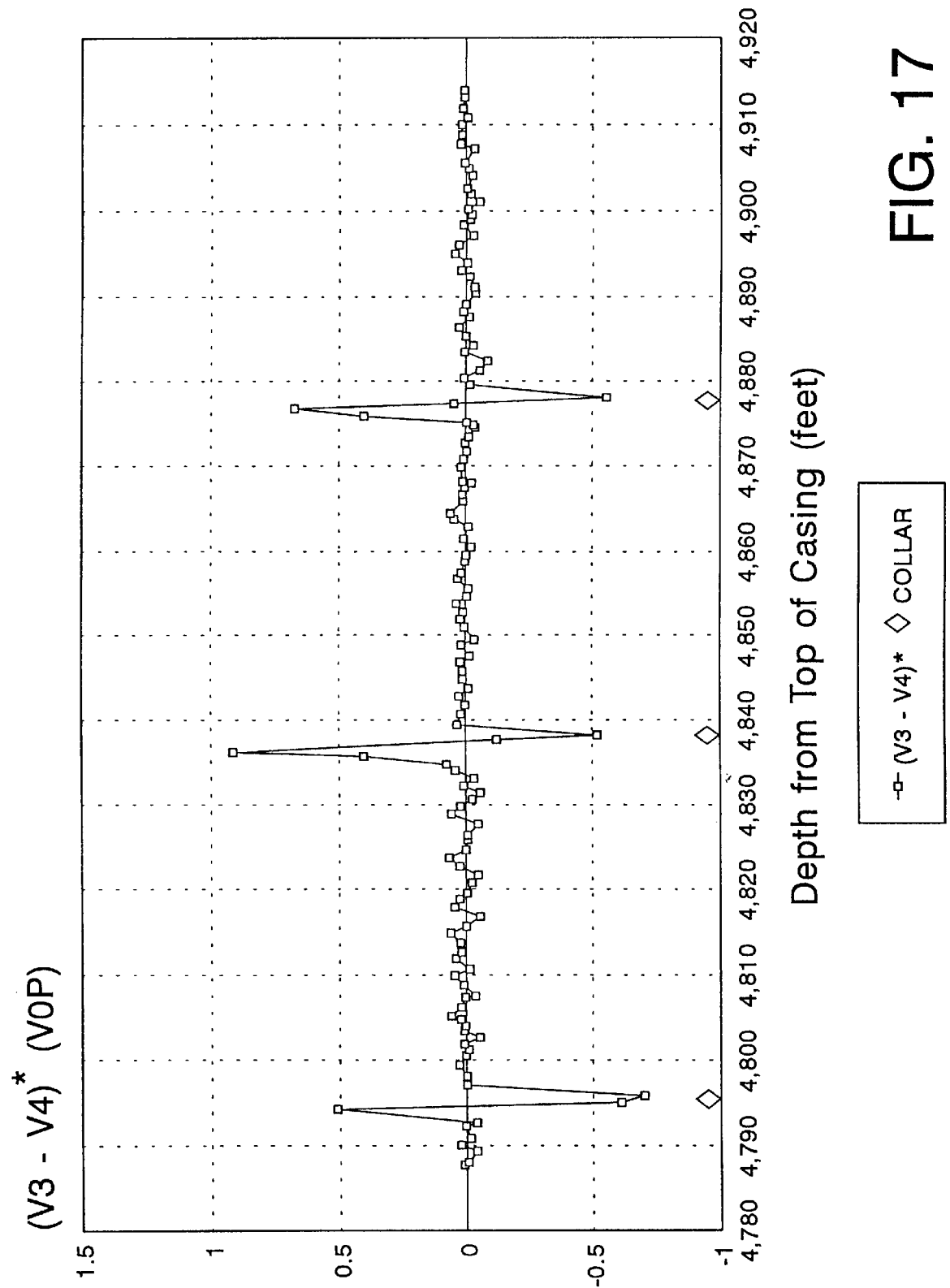
FIG. 17 shows (V3–V4)* in units of volts 0-peak vs. Depth in feet measured with the TCRT at the MWX-2 Well located in Rifle, Colo. at the frequency of 0.2 Hz.

FIG. 17 shows (V3–V4)* in units of volts 0-peak vs. Depth in feet measured with the TCRT at the MWX-2 Well located in Rifle, Colo. at the frequency of 0.2 Hz. The quantity (V3–V4)* is the quantity $V_N$ defined in Equation 4 of U.S. Ser. No. 07/434,886 {Vail(626)}. Here, V3 is the voltage drop between Electrodes C-D in the Preferred Null State, and V4 is the voltage drop between Electrode D-E in the Preferred Null State. The * is to remind the reader that this quantity does not satisfy Equation 27 in that patent. It is evident that collars can be located by determining "significant departures in (V3–V4)*" from the baseline measurements of (V3–V4)*. This quantity is one of the compensation quantities used to obtain resistivity with the TCRT. Therefore, collars can be located by identifying significant departures from the baseline of compensation quantities of the TCRT.

Figure 18:
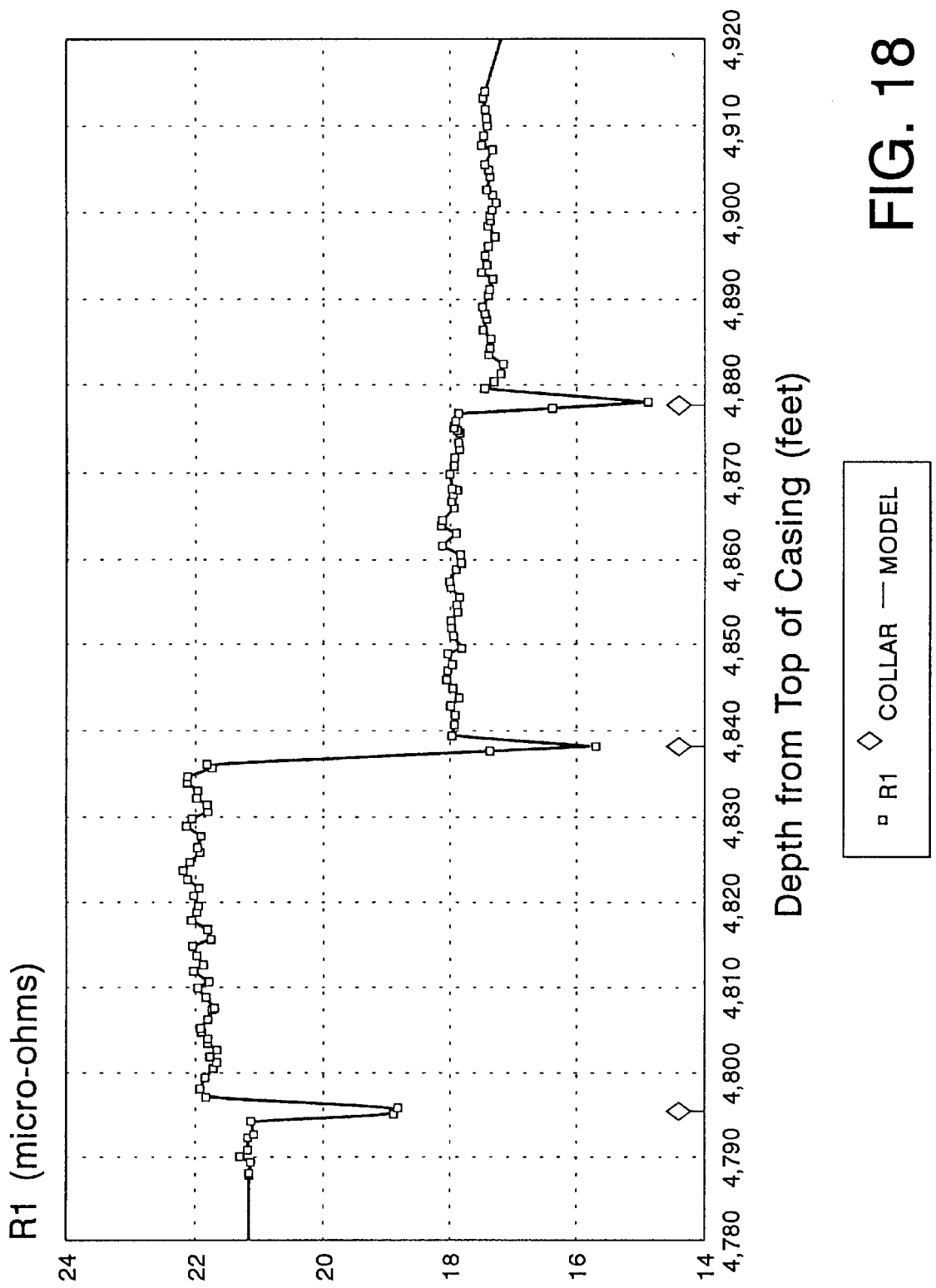
FIG. 18 shows measurements of R1 in units of micro-ohms vs. Depth in feet measured with the TCRT at the MWX-2 Well located in Rifle, Colo. at the frequency of 0.2 Hz and the model of R1.

FIG. 18 shows measurements of R1 in units of micro-ohms vs. Depth in feet measured with the TCRT at the MWX-2 Well located in Rifle, Colo. at the frequency of 0.2 Hz and the model of R1. The boxes present the measurements and the model is given by the straight line connection between these points.

Figure 19:
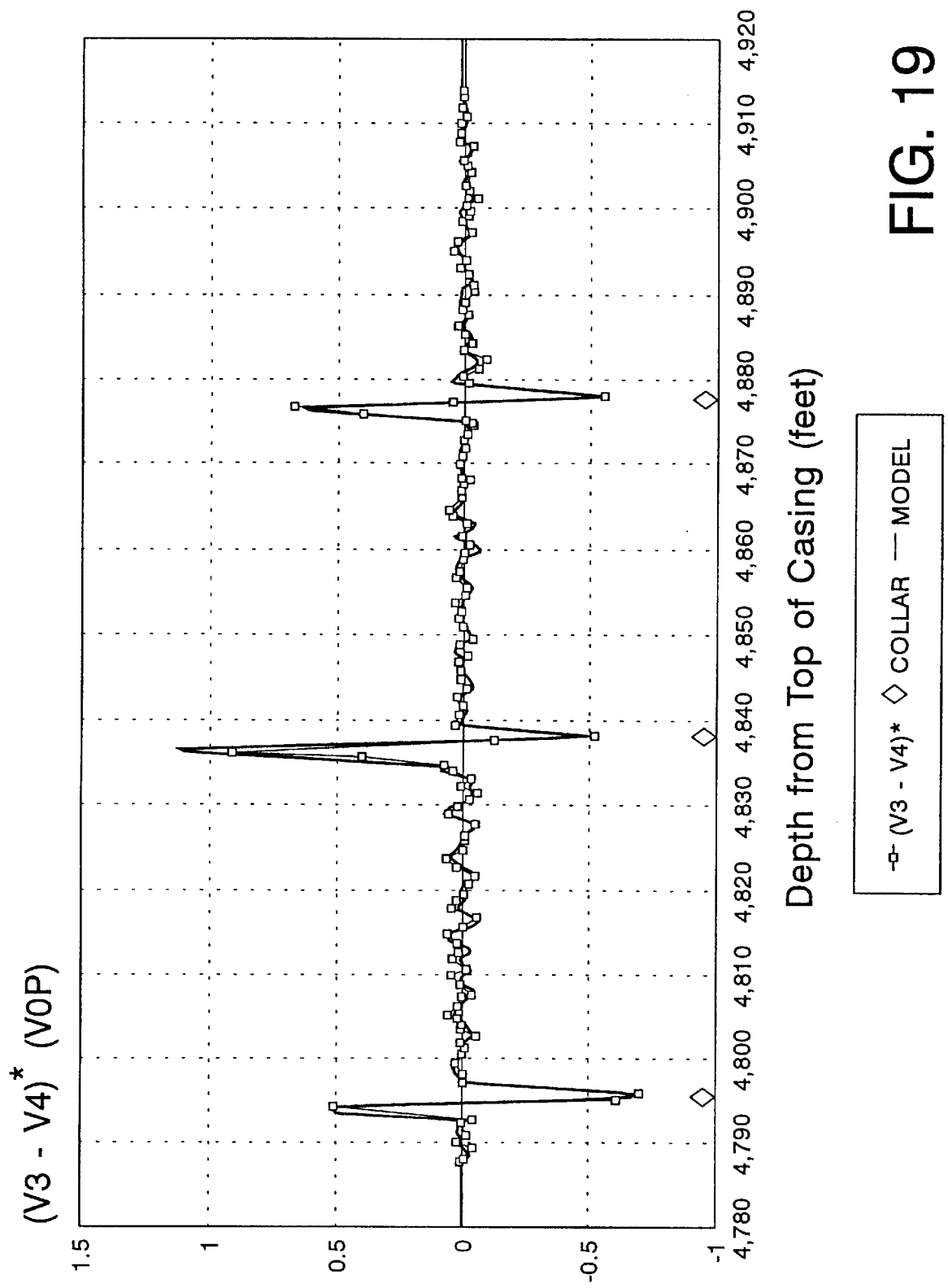
FIG. 19 shows measurements of (V3–V4)* in units of volts 0-peak vs. Depth in feet measured with the TCRT at the MWX-2 Well located in Rifle, Colo. at the frequency of 0.2 Hz and its model calculation.

FIG. 19 shows measurements of (V3–V4)* in units of volts 0-peak vs. Depth in feet measured with the TCRT at the MWX-2 Well located in Rifle, Colo. at the frequency of 0.2 Hz and its model calculation. The measured values of (V3–V4)* and the model calculation agree. The model calculation shows that significant excursions in compensation quantities used by the TCRT from their baseline values can be used to locate collars.

Figure 20:
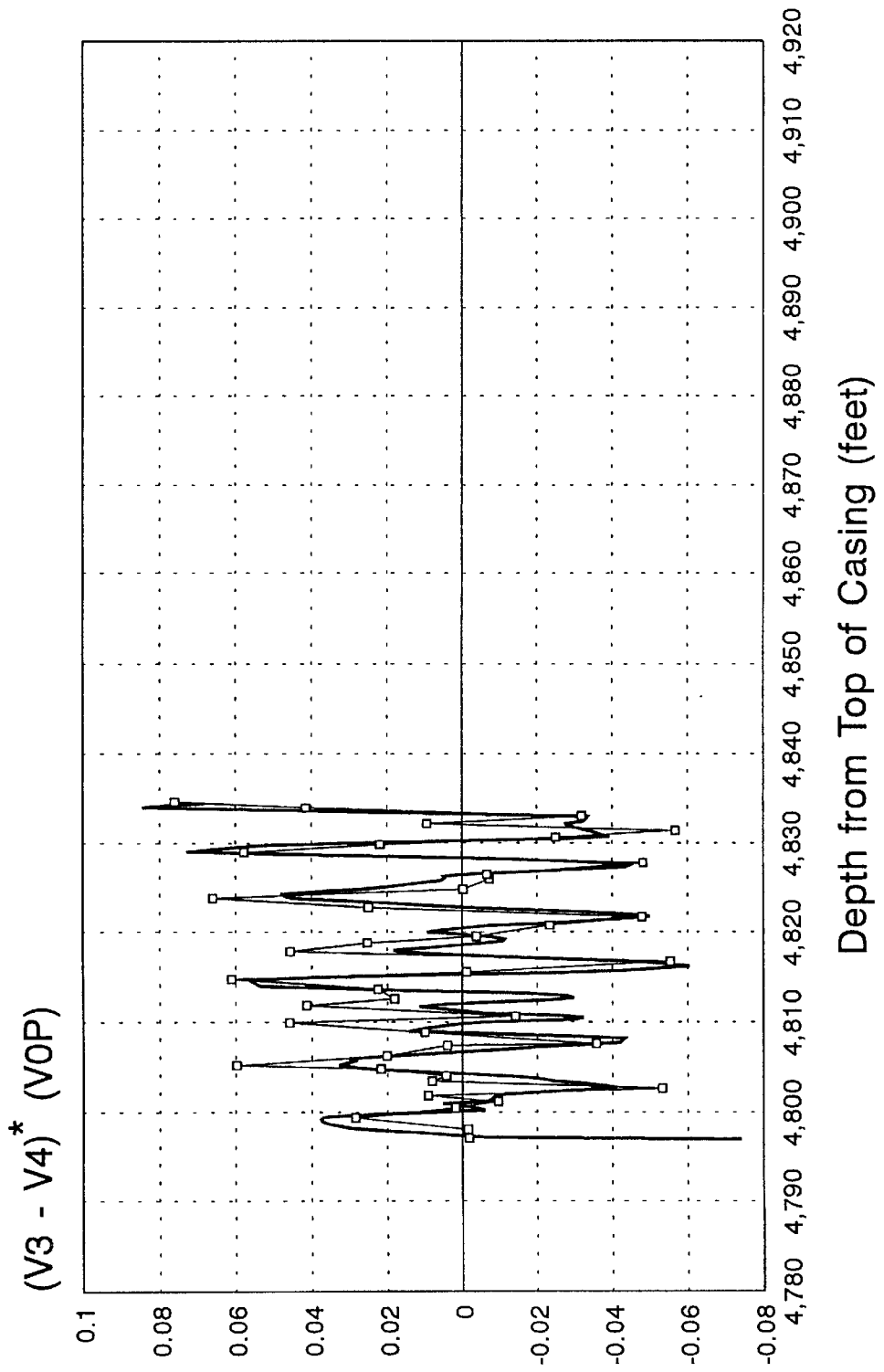
FIG. 20 shows measurements of (V3–V4)* on an expanded scale in units of volts 0-peak vs. Depth in feet measured with the TCRT at the MWX-2 Well located in Rifle, Colo. at the frequency of 0.2 Hz and its model calculation.

FIG. 20 shows measurements of (V3–V4)* on an expanded scale in units of volts 0-peak vs. Depth in feet measured with the TCRT at the MWX-2 Well located in Rifle, Colo. at the frequency of 0.2 Hz and its model calculation. This plot shows an expanded scale corresponding to FIG. 19. Agreement between the experiment and the model calculation is very good.

Because there is good agreement between the data and the above model calculation, it is verified that Equation 4 in U.S. Ser. No. 07/434,886 {Vail(626)} is valid. That patent states that variations in the casing resistance and variations in separations of electrode spacings will give variations in R1 which when multiplied by the current flowing along the pipe mask the signal due to current leakage. Put another way, "Term B" that is the First Order Error Term in U.S. Ser. No. 07/434,886 {Vail(626)} masks "Term A" that has the current leakage information in it. It should be noted that the quantity (V3–V4)* defined herein is equal to the quantity $V_N$ defined in Equation 4 of the patent. It is further evident from these results that the signature of (V3–V4)* can be used to locate the collars including at least the following signatures: (a) where it first crosses zero provided that there is a strong maximum of one sign on one side and a strong maximum of the opposite sign on the other side; (b) ½ way between two strong maxima of opposite signs; (c) just "large excursions" in (V3–V4)*; or (d) "significant excursions from the average baseline of (V3–V4)*.

It should be stated that the effect from the collars on the quantities V1–V2 or (V3–V4)* produce antisymmetric excursions about the center of the collar. (Here antisymmetric, means one sign of voltage on one side of the center line of the collar and the opposite sign of voltage on the other side of the center line of the collar. Symmetric would mean having the same sign on either side of the center line of the collar.)

It should also be stated that the antisymmetric shape of the discontinuities in $V_M$ in Equation 9 of U.S. Ser. No. 07/434,886 {Vail(626)} that is also called V1–V2 elsewhere, or the antisymmetric shape of the discontinues in $V_N$ or (V3–V4)*, which are both used by PML to identify collars, are not related to the shape of the discontinuities in current leakage at the collars as shown in FIG. 9 in Tabarovsky, et. al, 1994. Those discontinuities in leakage current near collars predicted by Tabarovsky, et. al., 1994 appear to be symmetric in shape about the center of the collar.

It should also be stated that the antisymmetric shape of the discontinuities in the apparent current leakage $\Delta I$ at high frequencies dominated by the skin effect that are used by PML to identify collars are not related to the shape of the discontinuities in current leakage at the collars as shown in FIG. 9 in Tabarovsky, et. al, 1994. Those discontinuities in leakage current near collars predicted by Tabarovsky, et. al., 1994 appear to be symmetric in shape about the center of the collar and are predicted for the frequency range where resistive effects dominate. However, the significant excursions in the "apparent leakage current" from the "baseline leakage current" shown in FIG. 15 at sufficiently high frequencies where the actual current leakage is dominated by the skin effect are able to locate the collars.

Therefore, the inventions herein are not anticipated by Tabarovsky, et. al, 1994.

Figure 21:
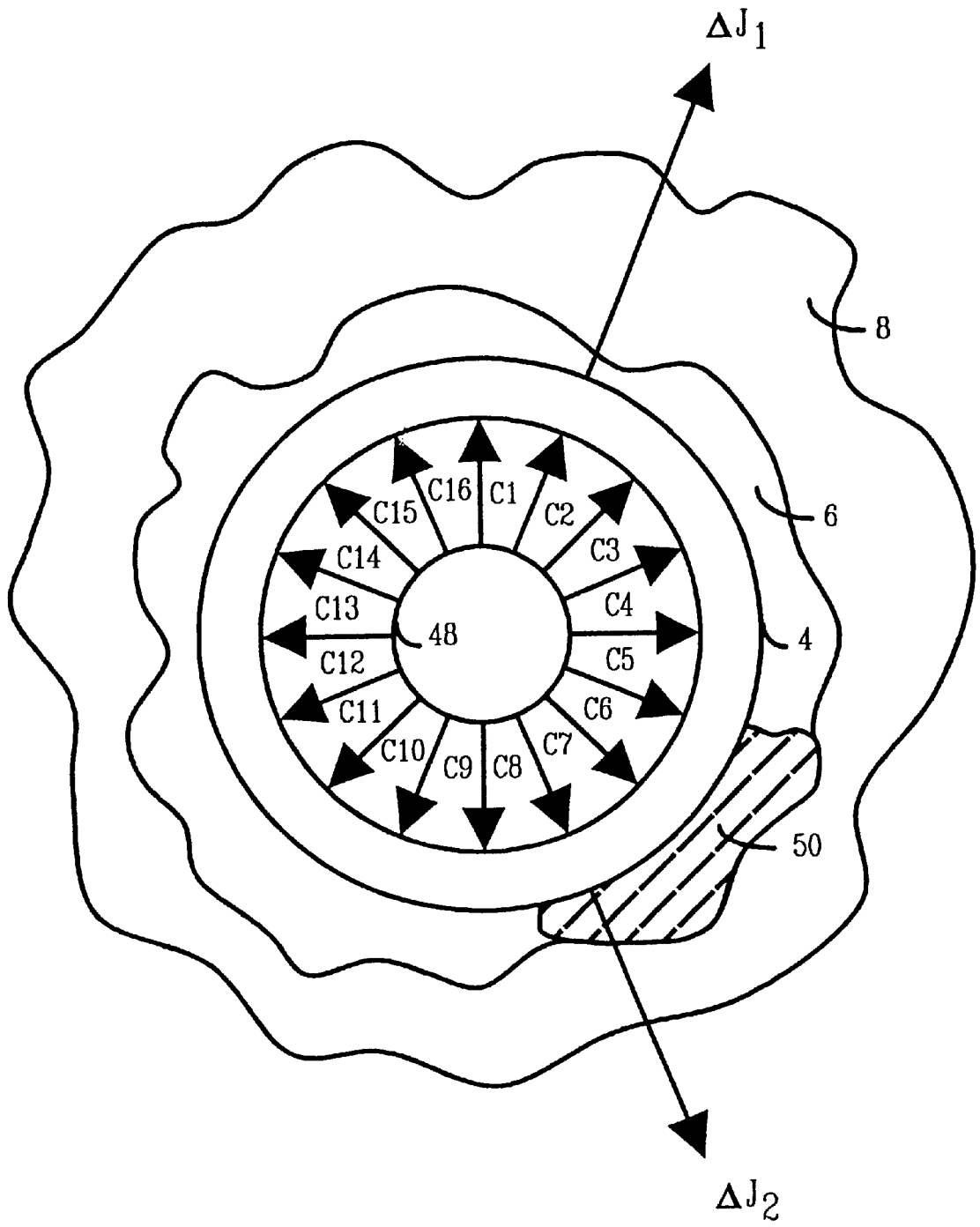
FIG. 21 shows radially disposed electrodes corresponding to Electrode C for casing and pipeline inspection purposes.

FIG. 21 shows radially disposed electrodes corresponding to Electrode C for casing and pipeline inspection purposes. Similarly, many radially disposed electrodes for D and E can be radially disposed as described beginning on page 22, line 57 of U.S. Ser. No. 07/089,697 {Vail(542)}. This disposition of electrodes is ideal to locate and identify small holes, breaks, discontinuities, or hairline cracks in casings and/or pipelines. The methods herein can therefore be used to locate imperfections, holes, breaks, discontinuities, hairline cracks and corrosion on the inside or the outside of the casing or pipeline present.

It is evident therefore that measurements performed on the inside of the casing or pipeline can be used to determine the presence of holes, cracks, breaks, or corrosion on either the inside or the outside of the casing or pipeline. Suitable variations in the frequency can be used to elucidate which side of the casing or pipeline has the corrosion marks.

It is evident therefore that measurements performed on the outside of the casing or pipeline can be used to determine the presence of holes, cracks, breaks, or corrosion on either the inside or the outside of the casing or pipeline. Suitable variations in the frequency can be used to elucidate which side of the casing or pipeline has the corrosion marks.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. A method for electrically inspecting a specific portion of a cased well surrounded by a geological formation using at least three vertically spaced apart voltage measuring electrodes and with resistances being defined between the vertically spaced apart voltage measurement electrodes, comprising:

providing first, second, and third vertically spaced apart voltage measurement electrode means that electrically engage the interior of the specific portion of the cased well with a first resistance being defined between first and second voltage measurement electrode means and a second resistance being defined between second and third voltage measurement electrode means;

providing voltage detector means that provides the separate voltage outputs respectively from said first, second, and third voltage measurement electrode means;

providing first A.C. current conduction means that generates and conducts a first A.C. current between a first current conducting electrode means in electrical contact with the interior of the cased well to a second current conducting electrode means located on the surface of the earth;

providing second A.C. current conduction means that alternatively generates and conducts a second A.C. current between said first current conducting electrode means and a third current conducting electrode means in electrical contact with the interior of the cased well whereby said third current conducting electrode means is located on a first vertical side of said three voltage measurement electrode means and whereby said first current conducting electrode means is located on a second vertical side of said three voltage measurement means;

obtaining measurements of the separate voltages from the three vertically spaced apart voltage measurement electrode means while first A.C. current is conducted through the formation that provides first measurement information relating to current flow into the formation;

obtaining measurements of the voltage outputs from said first and second voltage measurement electrode means while said second A.C. current is conducted between said first and third current conducting means that provides first compensation information related to said first resistance;

obtaining measurements of the voltage outputs from said second and third voltage measurement electrode means while said second A.C. current is conducted between said first and third current conducting electrode means that provides second compensation information relating to said second resistance; and using at least one of said measurement information and said first and said second compensation information to determine the average wall thickness of the casing between the first and second voltage measurement electrode means.

2. A method for electrically inspecting a specific portion of a cased well surrounded by a geological formation using at least three vertically spaced apart voltage measuring electrodes and with resistances being defined between the vertically spaced apart voltage measurement electrodes, comprising:

providing first, second, and third vertically spaced apart voltage measurement electrode means that electrically engage the interior of the specific portion of the cased well with a first resistance being defined between first and second voltage measurement electrode means and a second resistance being defined between second and third voltage measurement electrode means;

providing voltage detector means that provides the separate voltage outputs respectively from said first, second, and third voltage measurement electrode means;

providing first A.C. current conduction means that generates and conducts a first A.C. current between a first current conducting electrode means in electrical contact with the interior of the cased well to a second current conducting electrode means located on the surface of the earth;

providing second A.C. current conduction means that alternatively generates and conducts a second A.C. current between said first current conducting electrode means and a third current conducting electrode means in electrical contact with the interior of the cased well whereby said third current conducting electrode means is located on a first vertical side of said three voltage measurement electrode means and whereby said first current conducting electrode means is located on a second vertical side of said three voltage measurement means;

obtaining measurements of the separate voltages from the three vertically spaced apart voltage measurement electrode means while first A.C. current is conducted through the formation that provides first measurement information relating to current flow into the formation;

obtaining measurements of the voltage outputs from said first and second voltage measurement electrode means while said second A.C. current is conducted between said first and third current conducting means that provides first compensation information related to said first resistance;

obtaining measurements of the voltage outputs from said second and third voltage measurement electrode means while said second A.C. current is conducted between said first and third current conducting electrode means that provides second compensation information relating to said second resistance; and using at least one of said measurement information and said first and said second compensation information to locate and identify any casing collars adjacent to said first and second voltage measurement electrode means.

3. A method for electrically inspecting a specific portion of a cased well to determine the wall thickness of the specific portion of the casing, said cased well surrounded by a geological formation, using at least three vertically spaced apart voltage measuring electrodes and with resistances being defined between the vertically spaced apart voltage measurement electrodes, comprising:

providing first, second, and third vertically spaced apart voltage measurement electrode means that electrically engage the interior of the specific portion of the cased well with a first resistance being defined between first and second voltage measurement electrode means and a second resistance being defined between second and third voltage measurement electrode means;

providing voltage detector means that provides the separate voltage outputs respectively from said first, second, and third voltage measurement electrode means;

providing first A.C. current conduction means that generates and conducts a first A.C. current between a first current conducting electrode means in electrical contact with the interior of the cased well to a second current conducting electrode means located on the surface of the earth;

providing second A.C. current conduction means that alternatively generates and conducts a second A.C. current between said first current conducting electrode means and a third current conducting electrode means in electrical contact with the interior of the cased well whereby said third current conducting electrode means is located on a first vertical side of said three voltage measurement electrode means and whereby said first current conducting electrode means is located on a second vertical side of said three voltage measurement means;

obtaining measurements of the separate voltages from the three vertically spaced apart voltage measurement electrode means while first A.C. current is conducted through the formation that provides first measurement information relating to current flow into the formation;

obtaining measurements of the voltage outputs from said first and second voltage measurement electrode means while said second A.C. current is conducted between said first and third current conducting means that provides first compensation information related to said first resistance;

obtaining measurements of the voltage outputs from said second and third voltage measurement electrode means while said second A.C. current is conducted between said first and third current conducting electrode means that provides second compensation information relating to said second resistance; and using at least one of said measurement information and said first and said second compensation information to determine the wall thickness of the specific portion of the casing.

4. A method for electrically inspecting a specific portion of a cased well to locate and identify any casing collars present, said cased well surrounded by a geological formation, using at least three vertically spaced apart voltage measuring electrodes and with resistances being defined between the vertically spaced apart voltage measurement electrodes, comprising:

providing first, second, and third vertically spaced apart voltage measurement electrode means that electrically engage the interior of the specific portion of the cased well with a first resistance being defined between first and second voltage measurement electrode means and a second resistance being defined between second and third voltage measurement electrode means;

providing voltage detector means that provides the separate voltage outputs respectively from said first, second, and third voltage measurement electrode means;

providing first A.C. current conduction means that generates and conducts a first A.C. current between a first current conducting electrode means in electrical contact with the interior of the cased well to a second current conducting electrode means located on the surface of the earth;

providing second A.C. current conduction means that alternatively generates and conducts a second A.C. current between said first current conducting electrode means and a third current conducting electrode means in electrical contact with the interior of the cased well whereby said third current conducting electrode means is located on a first vertical side of said three voltage measurement electrode means and whereby said first current conducting electrode means is located on a second vertical side of said three voltage measurement means;

obtaining measurements of the separate voltages from the three vertically spaced apart voltage measurement electrode means while first A.C. current is conducted through the formation that provides first measurement information relating to current flow into the formation;

obtaining measurements of the voltage outputs from said first and second voltage measurement electrode means while said second A.C. current is conducted between said first and third current conducting means that provides first compensation information related to said first resistance;

obtaining measurements of the voltage outputs from said second and third voltage measurement electrode means while said second A.C. current is conducted between said first and third current conducting electrode means that provides second compensation information relating to said second resistance; and using at least one of said measurement information and said first and said second compensation information to locate and identify any casing collars adjacent to said first and second voltage measurement electrode means.

5. A method for electrically inspecting a specific portion of a conductive metallic pipe from within the conductive metallic pipe using at least three voltage measurement electrodes that are spaced apart along the interior length of the pipe and with resistances being defined between the spaced apart voltage measurement electrodes, comprising:

providing first, second and third voltage measurement electrode means that are in electrical contact with the interior of the pipe with a first resistance being defined between first and second voltage measurement electrode means and a second resistance being defined between second and third voltage measurement electrode means;

providing A.C. current generation and conduction means for conducting first A.C. current from a first current conducting electrode in electrical contact with the interior of the pipe to a second current conducting electrode in electrical contact with the interior of the pipe, whereby said first current conducting electrode is on a first side of said three voltage measurement electrode means and whereby said second current conducting electrode is on a second side of said three voltage measurement electrode means;

obtaining first information related to said first resistance from measurements with said first and second voltage measurement electrode means while said first A.C. current is conducted between said first and second current conducting electrodes;

obtaining second information relating to said second resistance from measurements with said second and third voltage measurement electrode means while said first A.C. current is conducted between said first and second current conducting electrodes;

using said first information to determine the average wall thickness of the specific portion of the pipe between the first and second voltage measurement electrode means.

6. A method for electrically inspecting a specific portion of a conductive metallic pipe from within the conductive metallic pipe using at least three voltage measurement electrodes that are spaced apart along the interior length of the pipe and with resistances being defined between the spaced apart voltage measurement electrodes, comprising:

providing first, second and third voltage measurement electrode means that are in electrical contact with the interior of the pipe with a first resistance being defined between first and second voltage measurement electrode means and a second resistance being defined between second and third voltage measurement electrode means;

providing A.C. current generation and conduction means for conducting a first A.C. current from a first current conducting electrode in electrical contact with the interior of the pipe to a second current conducting electrode in electrical contact with the interior of the pipe, whereby said first current conducting electrode is on a first side of said three voltage measurement electrode means and whereby said second current conducting electrode is on a second side of said three voltage measurement electrode means;

obtaining first information related to said first resistance from measurements with said first and second voltage measurement electrode means while said first A.C. current is conducted between said first and second current conducting electrodes;

obtaining second information relating to said second resistance from measurements with said second and third voltage measurement electrode means while said first A.C. current is conducted between said first and second current conducting electrodes;

using at least one of said first information and said second information to determine the identification and location of any joints joining the pipes together located adjacent to first, second, and third voltage measurement electrode means.

7. A method to electrically inspect a particular portion of a metallic casing surrounded by a geological formation at a predetermined depth from the surface of the earth, comprising at least the following steps:

(a) locating a plurality of at least three vertically spaced apart voltage measuring electrodes disposed within the metallic casing at said predetermined depth from the surface of the earth, said voltage measuring electrodes being in direct electrical contact with the particular portion of metallic casing to be inspected;

(b) generating and conducting a first electrical current through the particular portion of the metallic casing to be inspected;

(c) measuring at least the voltage differences between said vertically spaced apart voltage measuring electrodes while said first electrical current is conducted through the particular portion of the metallic casing to be inspected;

(d) amplifying said voltage differences; and (e) sending said amplified voltage differences to the surface of the earth via a cable for processing the amplified voltage differences on the surface of the earth.

8. A method to obtain information useful to determine the wall thickness of a portion of a metallic casing surrounded by a geological formation at a predetermined depth from the surface of the earth, comprising at least the following steps:

(a) locating a plurality of at least three vertically spaced apart voltage measuring electrodes disposed within the metallic casing at said predetermined depth from the surface of the earth, said voltage measuring electrodes being in direct electrical contact with the particular portion of metallic casing to be inspected;

(b) generating and conducting a first electrical current through the particular portion of the metallic casing to be inspected;

(c) measuring at least the voltage differences between said vertically spaced apart voltage measuring electrodes while said first electrical current is conducted through the particular portion of the metallic casing to be inspected;

(d) amplifying said voltage differences; and (e) sending said amplified voltage differences to the surface of the earth via a cable for processing the amplified voltage differences on the surface of the earth.

9. A method for determining the resistivity of a geological formation and for determining the wall thickness of the casing from within a cased well, comprising:

provulgating an apparatus having a first electrode that electrically engages a particular section of casing for receiving first voltage related signals at a specific depth within the well;

said apparatus having a second electrode that electrically engages the particular section of casing for receiving second voltage related signals located a first distance above said first electrode wherein the magnitude of the resistance of the portion of casing between said first and second electrodes is the first resistance; and said apparatus having a third electrode that electrically engages the particular section of casing for receiving third voltage related signals located a second distance below said first electrode wherein the magnitude of the resistance of the portion of casing between said first and third electrodes is the second resistance;

causing a first current to flow into the geological formation from the particular section of casing;

causing a second current to flow along the particular section of casing, whereby said second current has a substantially constant value as it flows along said particular section of casing that is electrically engaged with said first, second and third electrodes;

obtaining said first, second, and third voltage related signals while conducting said first current into formation during the measurement step;

determining the magnitude of said first resistance using at least a selected one of said first current and said second current;

determining the magnitude of said second resistance using at least a selected one of said first current and said second current; and processing the voltage related signals from each of said first, second and third electrodes obtained during the measurement step for use in determining the resistivity of the geological formation of interest, said processing taking into account the determined magnitudes of said first resistance and said second resistance to reduce the inaccuracy associated with the determination of the resistivity of the geological formation of interest, said processing further taking into account said values of the first resistance and the second resistance to provide the wall thickness of the casing of the particular section of casing at the specific depth within the well.

* * * * *